United States Patent [19]
Yamamoto et al.

[11] Patent Number: 6,034,840
[45] Date of Patent: Mar. 7, 2000

[54] DISK STORAGE APPARATUS AND DISK CARTRIDGE

[75] Inventors: Kazuyuki Yamamoto; Takashi Yamada; Minoru Watanabe, all of Kanagawa; Kazuo Takahashi, Tokyo, all of Japan

[73] Assignee: Sony Corporation, Tokyo, Japan

[21] Appl. No.: 08/913,760

[22] PCT Filed: Jan. 22, 1997

[86] PCT No.: PCT/JP97/00133

§ 371 Date: Jan. 8, 1998

§ 102(e) Date: Jan. 8, 1998

[87] PCT Pub. No.: WO97/27586

PCT Pub. Date: Jul. 31, 1997

[30] Foreign Application Priority Data

Jan. 22, 1996 [JP] Japan .................................. 8-008756

[51] Int. Cl.[7] .............................. G11B 5/55; G11B 17/02
[52] U.S. Cl. ....................................... 360/97.01; 360/106
[58] Field of Search ................................ 360/106, 97.01, 360/99.12

[56] References Cited

U.S. PATENT DOCUMENTS

| | | | |
|---|---|---|---|
| 4,503,474 | 3/1985 | Nigam | 360/133 |
| 5,218,503 | 6/1993 | Martin | 360/133 |
| 5,262,918 | 11/1993 | Tannert | 360/133 |
| 5,280,403 | 1/1994 | Martin | 360/133 |
| 5,317,464 | 5/1994 | Witt et al. | 360/99.08 |
| 5,398,141 | 3/1995 | Tannert | 360/133 |
| 5,444,586 | 8/1995 | Iftikar et al. | 360/99.12 |

FOREIGN PATENT DOCUMENTS

| | | |
|---|---|---|
| 61-16778 | 1/1986 | Japan . |
| 2-193377 | 7/1990 | Japan . |
| 4-352726 | 3/1992 | Japan . |

*Primary Examiner*—Robert S. Tupper
*Attorney, Agent, or Firm*—Limbach & Limbach LLP

[57] ABSTRACT

It is an object of the present invention to provide a disk storage apparatus which employs a rotary actuator mechanically excellent as compared with a linear-movement actuator and can employ, in a disk cartridge, a slidable shutter that easily prevents dusts from entering the disk cartridge, and a disk cartridge therefor.

The disk storage apparatus includes a disk cartridge in which a disk-like storage medium is rotatably accommodated, an apparatus body onto which the disk cartridge is detachably loaded, a shutter opening and closing mechanism provided on the apparatus body for, in an interlocking operation with an operation of attaching and detaching the disk cartridge, opening and closing a shutter capable of opening and closing a head-positioning-mechanism insertion slot of the disk cartridge, and a rotary head-positioning mechanism provided on the apparatus body for inserting a head portion for recording and/or reproducing information on and/or from the disk-like storage medium through the head-positioning-mechanism insertion slot opened when the disk cartridge is loaded. The disk cartridge includes a slidable shutter for opening and closing the head-positioning-mechanism insertion slot by its sliding operation. The rotary head-positioning mechanism includes a rotation actuator for inserting the head unit into the disk cartridge through the head-positioning-mechanism insertion slot.

According to the disk storage apparatus, it is possible to provide the disk storage apparatus which makes it difficult for the dusts to enter the disk cartridge and has a high reliability in the recording and/or reproduction.

17 Claims, 24 Drawing Sheets

EXPLANATION OF REFERENCE NUMBERS

| | |
|---|---|
| 7 | spindle motor |
| 22, 74 | removal disk storage apparatus (disk storage apparatus) |
| 23, 75 | apparatus bodies |
| 24 | chassis |
| 27 | cartridge insertion slot |
| 30 | opening and closing arm |
| 38 | rotation actuator |
| 39 | rotation shaft |
| 40, 77 | rotary arms |
| 40a | bent portion |
| 41 | drive coil |
| 45 | magnetic head (head unit) |
| 46 | load bar |
| 47, 79 | ramp members |
| 50, 80 | disk cartridges |
| 55 | hard disk (disk-like storage medium) |
| 56, 83 | head-positioning-mechanism insertion slots |
| 57, 82 | slidable shutters |
| 58 | torsion coil spring (springy body) |
| 64 | partitioning member |
| 76 | inline-type actuator (rotation actuator) |
| LA | segment connecting rotation center 0a of rotary head-positioning mechanism and rotation center of spindle motor 7 |
| LB | reference line of each of apparatus bodies 23, 75 |
| SC | reference circle |

DISK STORAGE APPARATUS AND DISK CARTRIDGE

TECHNICAL FIELD

The present invention relates to a large-capacity storage apparatus for use in an information processing apparatus and particularly to a disk storage apparatus employing a recording disk such as a magnetic disk, an optical disk, a magneto-optical disk or the like as an information storage medium and a disk cartridge for use in the above disk storage apparatus.

BACKGROUND ART

For example, an apparatus having an arrangement shown in FIGS. 22 and 23 has been generally known as a high-speed large-capacity disk storage apparatus such as a removable hard disk apparatus which is typical thereof, or the like.

This removable disk storage apparatus 1 employs a rotation actuator and has a apparatus body 2, a disk cartridge 3 detachably loaded onto this apparatus body 2, and so on. The apparatus body 2 has a chassis 4 having a cartridge accommodation chamber for accommodating the disk cartridge 3, a rotation actuator rotatably supported by the chassis 4, a magnetic head 6 attached to a tip end of the rotation actuator 5, a spindle motor 7 supported by the chassis 4 so as to be capable of being moved upward and downward, and so on.

A chucking magnet is attached to a rotation shaft of the spindle motor 7. A lifting mechanism, not shown, is operated in an interlocking operation with an operation of inserting and ejecting the disk cartridge 3, thereby the spindle motor 7 and the chucking magnet 8 being lifted up and down. As a result, when the spindle motor 7 is lifted up, the chucking magnet 8 chucks a metal hub 13 attached to a magnetic disk 9 accommodated in the disk cartridge 3, thereby the magnetic disk 9 being rotated together with the spindle motor.

The disk cartridge 3, as shown in FIG. 24 which is an exploded diagram showing a general arrangement thereof, has a pair of upper and lower shells 10, 11, the magnetic disk 9 rotatably accommodated in a disk accommodation chamber 12 between both of the shells 10, 11, and so on. The magnetic disk 9 has the metal hub 13 attached thereto such that its lower portion is rotatably engaged with a hub aperture 14 of the lower shell 11. Moreover, the disk cartridge 3 has a head insertion slot 15 permitting the rotation actuator 5 to be inserted thereinto and drawn therefrom. A shutter 16 for opening and closing the head insertion slot 15 is attached to the head insertion slot, and the shutter 16 prevents dusts from being entering the disk cartridge when the disk cartridge is not loaded.

The shutter 16 of the disk cartridge 3 is rotatably supported by the upper shell 10 at projections 16a projected from their both ends. The shutter 16 is rotated by a shutter opening and closing mechanism, not shown, attached to the apparatus body 2 and a free end side of the shutter 16 is rotated so as to be projected outward from the head insertion slot 15, thereby the head insertion slot 15 being opened. Thus, the rotation actuator 5 can be inserted into the head insertion slot.

Thus, as shown in FIG. 22, when the disk cartridge 3 is inserted into the removable disk storage apparatus 1, the shutter 16 of the disk cartridge 3 is automatically opened by the shutter opening and closing mechanism. When the disk cartridge 3 is inserted and reaches a predetermined position, the spindle motor 7 is lifted up to attract the metal hub 13 by a magnetic force of the chucking magnet 8. Thus, the magnetic disk 9 and spindle motor 7 can be rotated together (chucking).

When the spindle motor 7 is rotated and a angular speed of the magnetic disk 9 becomes constant, the magnetic head 6 provided at the tip end of the rotation actuator 5 is brought close to a recording surface of the magnetic disk 9. Thus, preparation for recording (reproducing) information on (from) the magnetic disk 9 is completed and then a predetermined signal is supplied to the magnetic head 9, which enables a desired information to be recorded on (or reproduced from) the information recording surface of the magnetic disk 9.

An apparatus having an arrangement shown in FIG. 25 has been known as a conventional removable disk storage apparatus. This removable disk storage apparatus 17 employs a linear-movement actuator and is remarkably different from the above-mentioned removable disk storage apparatus 1 in that a linear-movement actuator 18 is moved straight.

Specifically, the removable disk storage apparatus 17 has an apparatus body 19 having the linear-movement actuator 18 and a disk cartridge 20. The linear-movement actuator 18 is disposed at the center of a bottom portion of a chassis 4 with a magnetic head provided at its tip end being faced toward an insertion slot of the apparatus body 19. The disk cartridge 20 has a head insertion slot 21 provided at the center of a bottom portion of the disk cartridge 20 so as to be opposed to the linear-movement actuator. A slidable shutter similar to a shutter employed by a 3.5-inch floppy disk cartridge is provided at the head insertion slot 21. When the slidable shutter is slid in the width direction of the disk cartridge, the head insertion slot 21 is opened and closed.

However, since the removable disk storage apparatus employing the rotation actuator has the rotation actuator 5 which can be rotated in the horizontal direction and whose tip end portion enters the head insertion slot 15 of the disk cartridge 3 in the direction from the diagonal side as shown in FIG. 22, a horizontal-direction length of the head insertion slot 15 must be sufficiently long so that the magnetic head 6 attached to the tip end of the rotation actuator 5 can be moved toward the innermost side of the information storage surface, i.e., close to the metal hub. As a result, such removable disk storage apparatus cannot employ a slidable shutter which must be inevitably slid by a considerable length, and hence inevitably employ a rotation shutter described above as the shutter 16.

However, when the rotary shutter is employed, even if the rotary shutter is closed, clearances are easily produced around the head insertion slot 15. Therefore, dusts which are great menaces to the storage apparatus of this kind easily enter the disk cartridge. Moreover, since the rotary shutter requires the projections 16a as a rotation center of the shutter 16, not only a shaft diameter of the projection 16a but also the supporting mechanism therefor must have certain thicknesses, which makes it difficult to make the cartridge thinner, and the stress is intensively applied to the projections 16a, which lowers the reliability of strength of the shutter.

When the linear-movement actuator is employed, the linear-movement actuator 18 can be moved straight and hence the tip end portion of the linear-movement actuator 18 enters the head insertion slot 21 of the disk cartridge 3 straight. Therefore, even when the magnetic head 6 provided at the tip end of the linear-movement actuator 18 is moved close to the metal hub 13, the horizontal-direction length of the head insertion slot 21 needs not to be long and hence the removable disk storage apparatus can employ the above slidable shutter.

However, since the linear-movement actuator 18 tends to be easily influenced by an external disturbance upon its linear movement, it is impossible to secure high shock-proof property against a shock applied to the disk storage apparatus. Moveover, since the linear-movement actuator 18 has a large inertial mass as compared with that of the rotary actuator 5, a seek speed of the disk storage apparatus employing the linear-movement actuator 18 becomes slow as compared with one employing the rotary actuator 5. Moreover, since an arrangement of the linear-movement actuator 18 is complicated as compared with that of the rotary actuator 5, manufacturing costs for the linear-movement actuator are increased as compared with those of the rotary actuator.

The present invention is made in view of the above problems, and it is an object of the present invention to provide a disk storage apparatus which employs a rotary actuator mechanically excellent as compared with a linear-movement actuator and can employ, in a disk cartridge, a slidable shutter that easily prevents dusts from entering the disk cartridge, and a disk cartridge therefor.

DISCLOSURE OF THE INVENTION

A disk storage apparatus according to the present invention includes a disk cartridge in which a disk-like storage medium is rotatably accommodated, an apparatus body onto which the disk cartridge is detachably loaded, a shutter opening and closing mechanism provided on the apparatus body for, in an interlocking operation with an operation of attaching and detaching the disk cartridge, opening and closing a shutter capable of opening and closing a head-positioning-mechanism insertion slot of the disk cartridge, and a rotary head-positioning mechanism provided on the apparatus body for inserting a head portion for recording and/or reproducing information on and/or from the disk-like storage medium through the head-positioning-mechanism insertion slot opened when the disk cartridge is loaded. The disk cartridge comprises a slidable shutter for opening and closing the head-positioning-mechanism insertion slot by its sliding operation. The rotary head-positioning mechanism comprises a rotation actuator for inserting the head unit into the disk cartridge through the head-positioning-mechanism insertion slot.

Moreover, a disk storage apparatus according to the present invention is a disk storage apparatus employing a detachable disk cartridge. The disk cartridge comprises a head-positioning-mechanism insertion slot. The head-positioning-mechanism insertion slot can be opened and closed by a slidable shutter moved in parallel. The disk apparatus comprises a spindle motor for rotating a disk and a rotary head-positioning mechanism having a bent portion at its middle portion and comprising a rotation actuator. A segment connecting a rotation center of the spindle motor and a rotation center of the rotary head-positioning mechanism lies at right angles to a segment representing a parallel movement of the slidable shutter.

A disk cartridge according to the present invention includes a cartridge housing in which a disk accommodation chamber is formed by bonding a pair of shells, a disk-like storage medium rotatably accommodated in the disk accommodation chamber, a head-positioning-mechanism insertion slot provided on the cartridge housing for inserting and drawing a head unit for recording and/or reproducing information on and/or information storage surface of the disk-like storage medium, a slidable shutter for opening and closing the head-positioning-mechanism insertion slot, and an springy body for biasing the slidable shutter in the direction in which the slot is closed. There is provided a partitioning member for partitioning the disk accommodation chamber in the direction in which the pair of shells are overlapped each other and the springy body is disposed in the direction in which it overlaps with the disk-like storage medium through the partitioning member.

BEST MODE FOR CARRYING OUT THE INVENTION

A disk storage apparatus and a disk cartridge according to an embodiment of the present invention will hereinafter be described with reference to the accompanying drawings.
[outer appearance and arrangement of disk storage apparatus]

Figure 1:
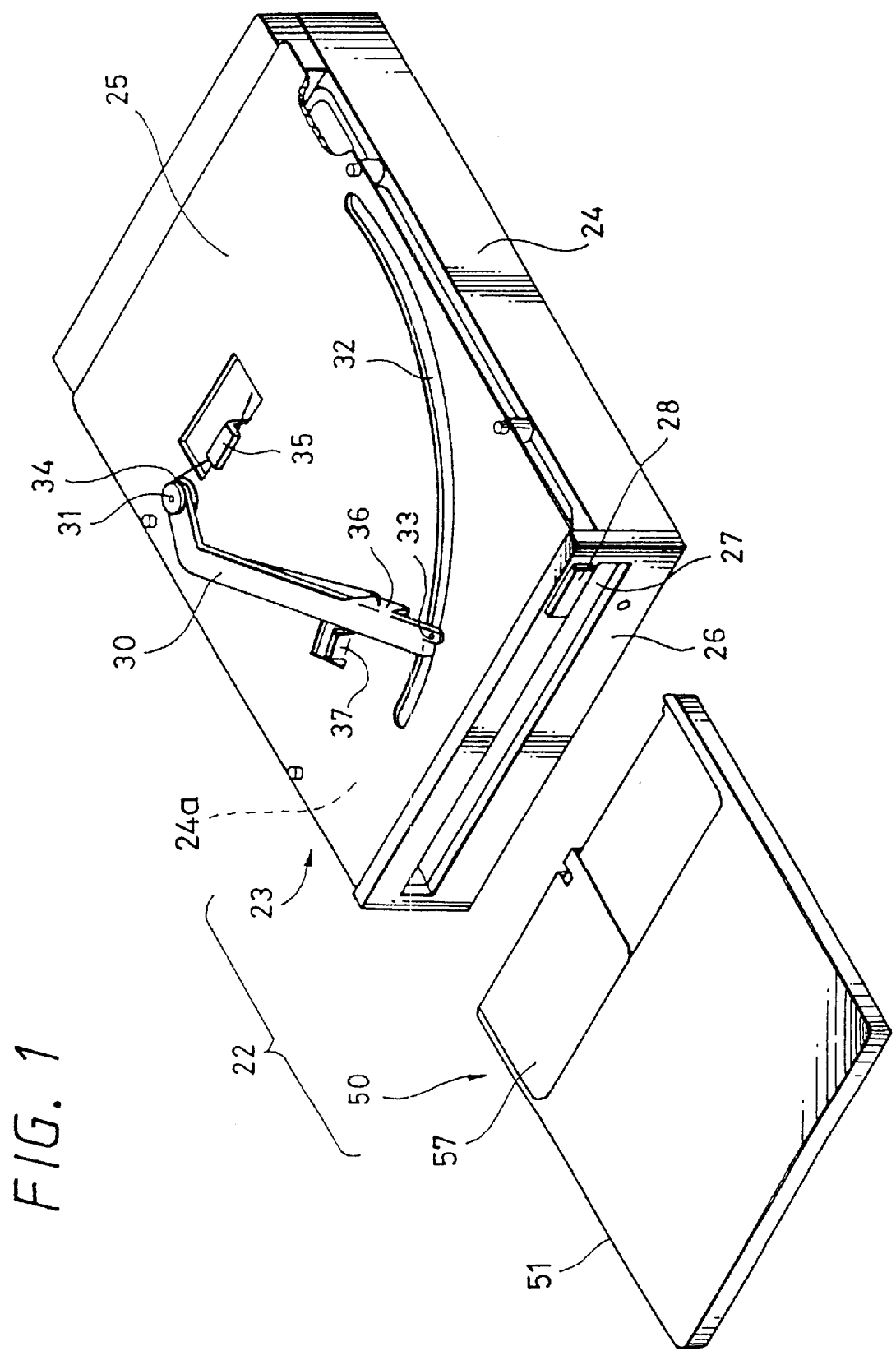
FIG. 1 is a perspective view showing an outer appearance of a disk storage apparatus according to a first embodiment of the present invention.

FIG. 1 is a diagram showing a removable disk storage apparatus 22 serving as a disk storage apparatus according to this embodiment. This removable disk storage apparatus 22 has an apparatus body 23 having a shutter opening and closing mechanism and a rotary head-positioning mechanism, and a disk cartridge 50 detachably loaded onto the apparatus body 23. The apparatus body 23 has a chassis 24 provided with a cartridge accommodation chamber 24a for accommodating the disk cartridge 50, a cover plate 25 covering an upper surface of the chassis 24, a front panel 26 covering the chassis 24 and a front surface of the cover plate 25, and so on. The cover plate 25 and the front panel 26 are screwed and fixed on the chassis 24 by fitting screws, not shown, so as to be integral together.

The front panel 26 has a cartridge insertion slot 27 through which the disk cartridge is inserted into the apparatus body and ejected therefrom and which is formed so as to be long in the horizontal direction. When the disk cartridge 50 is inserted into the apparatus body 23 through the cartridge insertion slot 27, the disk cartridge 50 is loaded onto a disk-cartridge loading portion provided in the cartridge accommodation chamber 24a. Moreover, an eject button 28 used for automatically ejecting the loaded disk cartridge 50 is provided at a portion, located above the cartridge insertion slot 27, of the front panel 26.

An opening and closing arm 30 of the shutter opening and closing mechanism is slidably attached to an upper surface of the cover plate 25. The opening and closing arm 30 is rotatably supported at its rear end portion by a rotation shaft 31 on a rear surface side of the cover plate 25 and is also slidably engaged at its front end portion with an arc-shaped guide groove 32 formed through the cover plate 25. The opening and closing arm 30 has an opening and closing pin 33 formed at the front end portion thereof so as to be pierced through the guide groove 32 and to reach the inside of the cartridge accommodation chamber 24a.

Moveover, the rotation shaft 31 is loosely engaged with a coil portion of a coil spring 34 which is an example of a springy body. The coil spring 34 is engaged at its one end with a spring receiving piece 35 of the cover plate 25 and engaged at the other end with a spring receiving piece 36 of the opening and closing arm 30, thereby the opening and closing arm 30 being constantly biased toward the front panel 26 by a spring force of the coil spring 34. A stopper piece 37 provided on the cover plate 25 restricts a movement of the opening and closing arm 30 toward the front panel 26.
[arrangement of disk cartridge]

The disk cartridge 50 inserted into and ejected from the apparatus body through the cartridge insertion slot 27 of the front panel 26 is arranged as shown in FIGS. 1 to 3 and 8 to 16.

Specifically, the disk cartridge 50 has a cartridge housing 51 formed by bonding a pair of upper and lower shells 52, 52 together, a hard disk 55 which is an example of a disk-like storage medium rotatably accommodated in a disk chamber 54 formed in the cartridge housing 51, a slidable shutter 57 for opening and closing a head-positioning-mechanism insertion slot 56 formed between the upper and lower shells 52, 53 by its sliding operation, a torsion coil spring 58 which is an example of a springy body for constantly biasing the slidable shutter 57 in the direction in which the head-positioning-mechanism insertion slot 56 is closed, a partitioning member 60 for partitioning the disk accommodation chamber 54 in the direction the upper and lower shells 52, 53 are overlapped each other, and so on.

Figure 13:
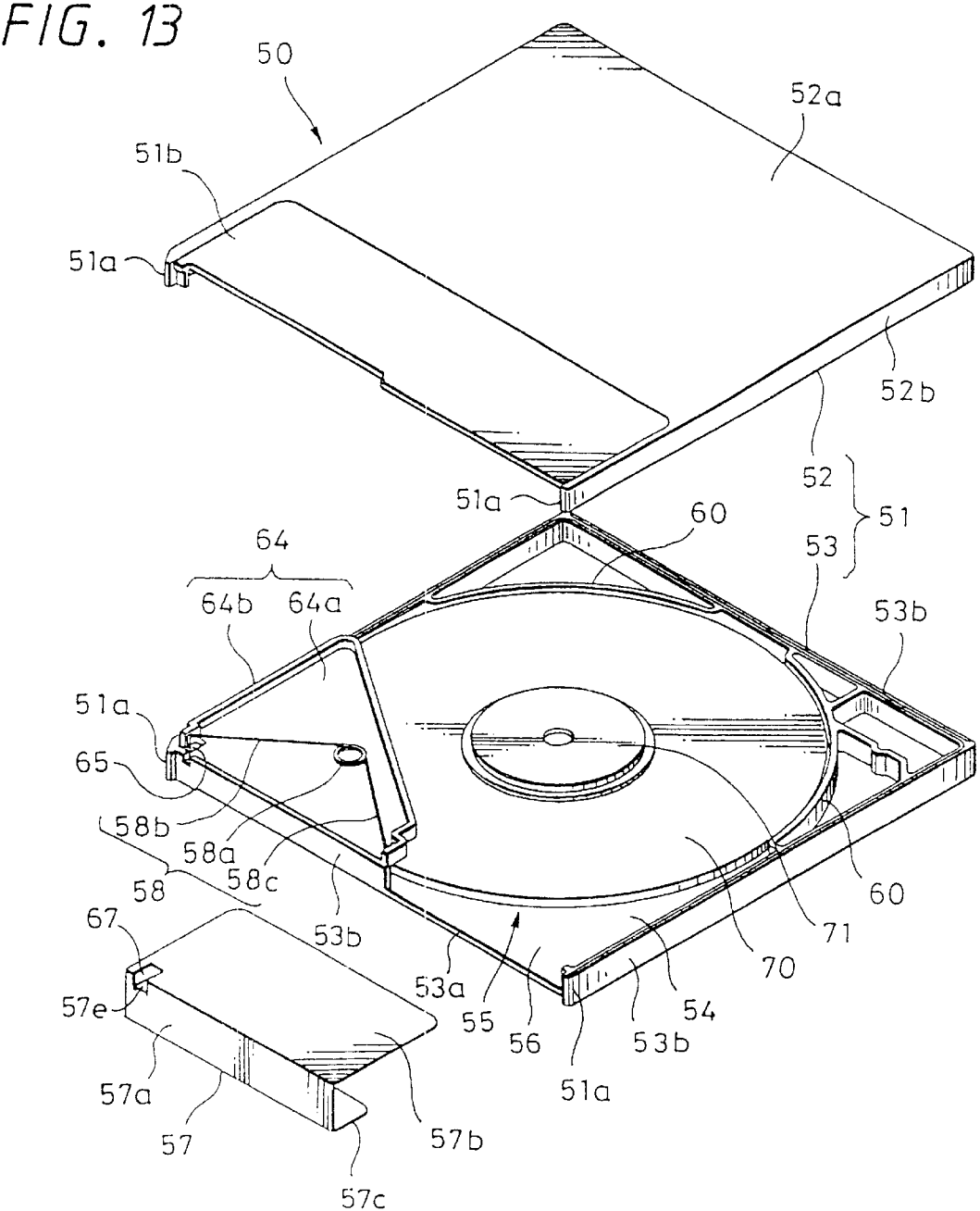
FIG. 13 is an exploded, perspective view showing a state that the disk cartridge shown in FIG. 12.
Figure 14:
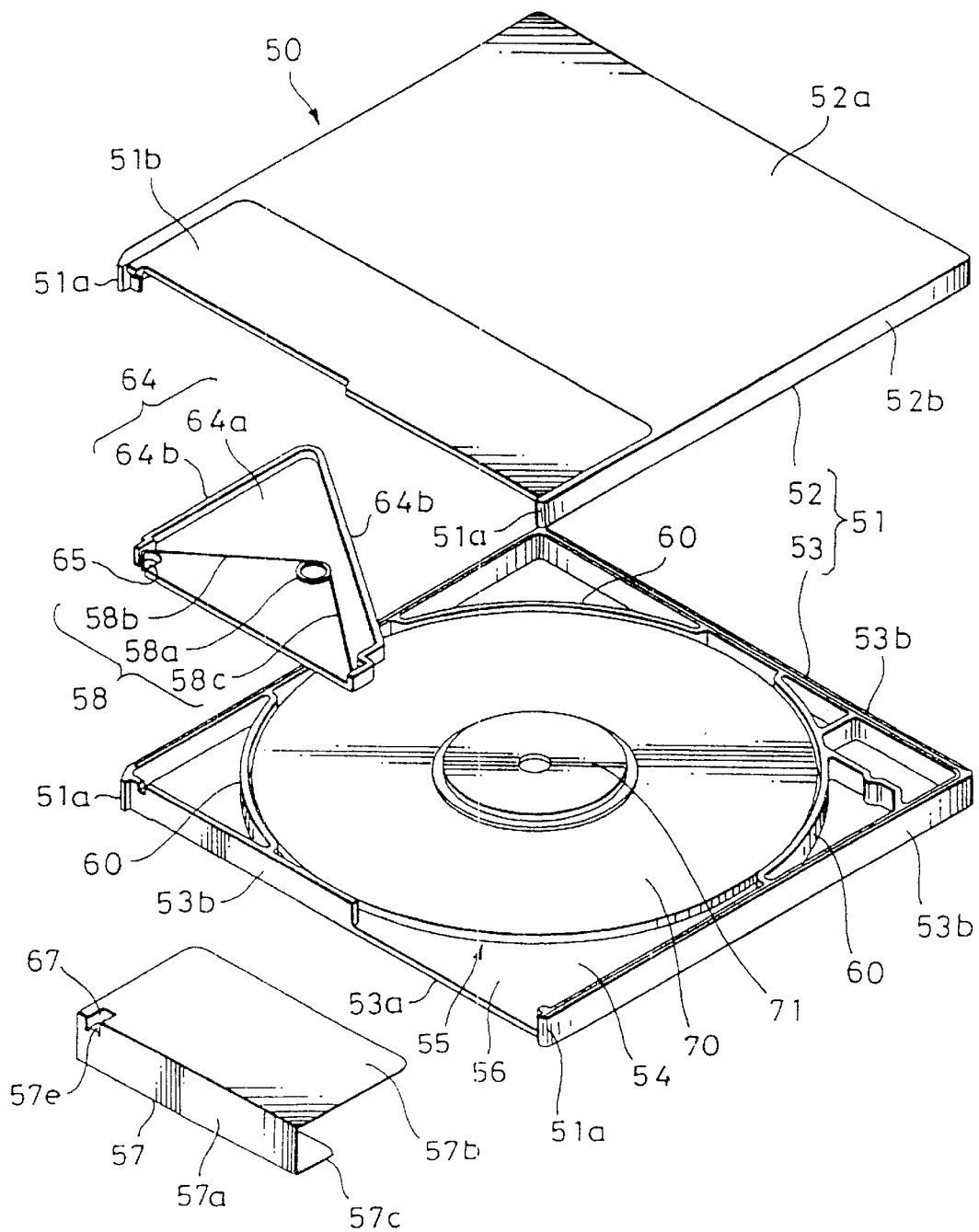
FIG. 14 is an exploded, perspective view showing the disk cartridge shown in FIG. 13 in a state that a partitioning member is separated.
Figure 15:
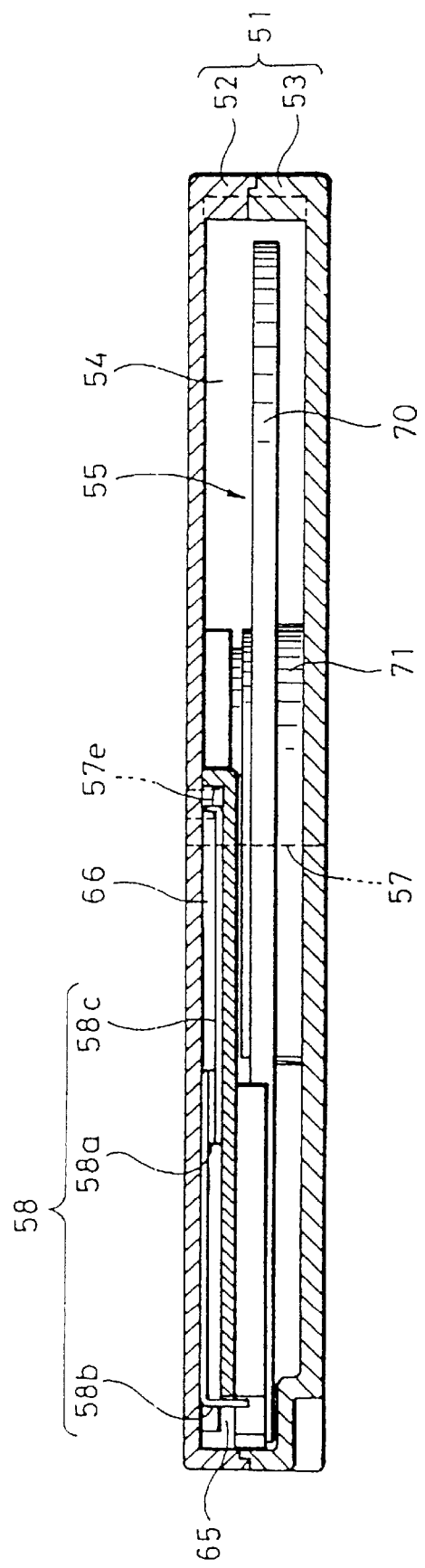
FIG. 15 is an enlarged, cross-sectional view of the disk cartridge shown in FIG. 8 cut along a line A—A.
Figure 16:
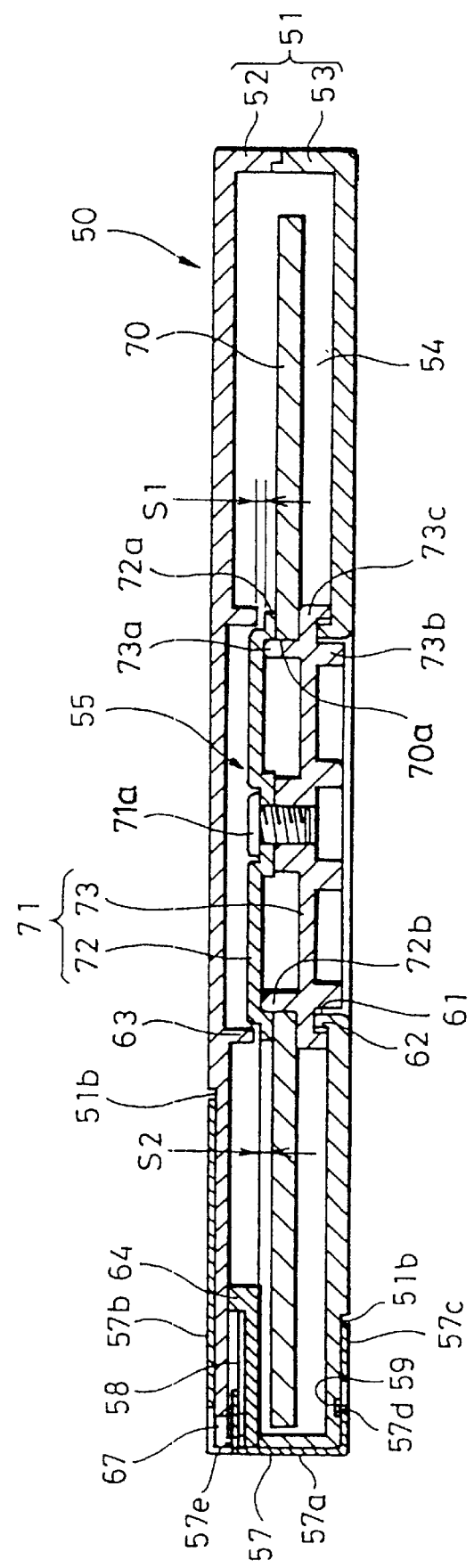
FIG. 16 is an enlarged, cross-sectional view of the disk cartridge shown in FIG. 8 cut along a line B—B.

As shown in FIGS. 13, 14 and so on, the upper shell 52 has a rectangular upper surface plate 52a and side surface plates continuously formed at three sides of the upper surface plates 52a. A remaining one side thereof adjacent to which no side surface plate 52b is formed is a front of the upper shell. The lower shell 53 has a rectangular lower surface plate 53a and side surface plates 53b continuously formed at four sides of the lower surface plates 53a. A notch portion is provided at the side surface plate 53b opposed to the front of the upper shell 52. The head-positioning-mechanism insertion slot 56 is formed of a space surrounded by this notch portion and the upper shell 52. Therefore, the cartridge housing 51 has an exterior shape which is box-shaped, and the upper and lower shells 52, 53 are screwed and fixed on each other by a plurality of fitting screws, not shown, thereby the cartridge housing 51 being capable of being assembled and disassembled.

The head-positioning-mechanism insertion slot 56 provided at the front of the cartridge housing 51 is formed so as to be located at a portion substantially ranging from a center of the front to one end edge thereof. The head-positioning-mechanism insertion slot 56 can be opened and closed by the slidable shutter 57 slidably attached to the front side of the cartridge housing 51. Moveover, in order to position an outer surface of the slidable shutter 57 inward with reference to outer surfaces of the upper and lower shells 52, 53, a front surface plate of the cartridge housing 51 is formed so as to be displaced from projection portions 51a at both ends thereof inward, and concave portions 51b each having a proper depth are provided at the upper surface plate 52a and the lower surface plate 53a.

The slidable shutter 57 has a front surface piece 57a and plane pieces 57b, 57c continuously formed at both ends of the front piece 57a and also formed so as to be opposed to and in parallel to each other. The head-positioning-mechanism insertion slot 56 is opened and closed by the front surface piece 57a. A click portion 57d is formed at the lower plane piece 57c of the slidable shutter 57 by bending a part of the lower plane piece inward. The click portion 57d is engaged with a guide groove 59 provided on the lower shell 53, thereby the slidable shutter 57 being prevented from being detached.

Moreover, an operation concave portion 67 is formed at a portion, on the opposite side of the head-positioning-mechanism insertion slot 56, of the slidable shutter 57 where the upper plane piece 57b and the front surface piece 57a are continuously connected to each other, by bending parts of the upper plane piece and the front surface piece inward. A cut piece 57e formed by cutting the operation concave portion 67 has a slit engaged with one end of the torsion coil spring 58.

Moreover, arc-shaped side walls 60 are provided at three corner portions in the lower shell 53 except one corner portion where the head-positioning-mechanism insertion slot 56 is provided. The hard disk 55 is accommodated in a circular space surrounded by these side walls 60. A hub aperture 61 loosely engaged with a metal hub 71 of the hard disk 55 is formed through a center of the lower shell 53. A lower ring projection portion 62 projected from the lower shell so as to be ring-shaped is formed at an inner peripheral edge of the hub aperture 61.

An upper ring projection portion 63 having substantially the same size as the lower ring projection portion is formed at the center of an inner surface of the upper shell 52 so as to be opposed to the lower ring projection portion 62 of the lower shell 53.

The partitioning member 64 has a right-triangle-shaped partitioning piece 64a and surrounding pieces 64b continuously formed on three sides of the partitioning piece 64a except one side thereof on the front side. The partitioning member has an opening portion where a springy member is inserted at its front side. Moreover, a notch 65 engaged with one arm portion 58b of the torsion coil spring 58 is formed at a right angle portion of the partitioning piece 64a.

In a state that the right triangle portion of the partitioning member 64 is positioned at the corner portion, on the opposite side of the head-positioning-mechanism insertion slot 56, of the front surface side of the upper shell 52, end surfaces of the respective surrounding pieces 64b are fitted to an inner surface of the upper shell 52, thereby the partitioning member 64 being fixed on the upper shell 52. Various means such as a means for a means for adhesion with an adhesive, a means for melting members by heat to weld them together, or the like can be employed as a means for fixing the partitioning member 64.

A springy body accommodation chamber 66 is formed of a space surrounded by the partitioning member 64 and the upper shell 52. The torsion coil spring 58 which is an example of a springy body for biasing the slidable shutter 57 is accommodated in the springy-body accommodation chamber 66. As shown in FIGS. 13 to 16 and so on, the torsion coil spring 58 has a coil portion 58a wound proper times at the center, and a pair of arm portions 58b, 58c continuously formed at both ends of the coil portion 58a. Tip ends of the respective arm portions 58b, 58c are bent outward with respect to a direction of a center line of the coil portion 58. The tip end of the one arm portion 58b of the torsion coil spring 58 is engaged with the notch 65 of the partitioning member 64, and the tip[ end of the other arm portion 58c thereof is engaged with the slit of the cut piece 57e of the slidable shutter 57. The slidable shutter 57 is constantly biased by the spring force of the torsion coil spring 58 toward the direction in which the head-positioning-mechanism insertion slot 56 is closed.

The hard disk 55 has a disk member 70 having information storage surfaces at both of its upper and lower surfaces, the metal hub 71 formed of a pair of hub plates 72, 73 for gripping upper and lower center portions of the disk member 70 to hold the disk member, and a fitting screw 71a for screwing both of the hub plates 72, 73 to be integral together. The lower hub plate 73 has a disk engagement portion 73a engaged with a center aperture of the disk member 70, a hub engagement portion 73b formed on the opposite side of the disk engagement portion 73a and loosely engaged with the hub aperture 61, and a flange portion 73c for supporting substantially inner peripheral edge of the disk member 70. In a non-chucking state that the hard disk 55 is not loaded onto the spindle motor 7, the flange portion 73c of the lower hub plate 73 is mounted on the lower ring projection portion 62.

The upper hub plate 72 of the metal hub 71 has a flange portion 72a for gripping the peripheral edge portion of the center aperture 70a of the disk member 70 together with the flange portion 73c of the lower hub plate 73. If the disk engagement portion 73a is engaged with a ring-shaped concave portion 72b formed on the inner side of the flange portion 72a, then the upper and lower hub plates 72, 73 are mutually positioned and assembled coaxially.

A clearance S1 between an upper surface of the flange portion 72a of the upper hub plate 72 and a lower surface of the upper ring-shaped projection portion 63 is set smaller than a clearance S2 between a lower surface of the partitioning member 64 and the disk member 70 (S1<S2). Therefore, for example, even if the disk cartridge 50 is put upside down, the flange portion 72a of the upper hub plate 72a can be brought in contact with the lower surface of the upper ring-shaped projection portion 63, while the information storage surface of the disk member 70 is prevented from being brought in contact with the lower surface of the partitioning member 64. The information storage surface of the disk member 70 is finished with high accuracy so as not to be fluctuated when rotated.

While synthetic resin such as polycarbonate (PC), polyolefin or the like is suitable for a material of the disk member 70, it is needless to say that other synthetic resin can be employed. Further, other than synthetic resin, various materials such as, for example, glass, aluminum alloy or the like can be employed. Various materials such as carbon steel. alloy steel or the like can be employed as long as they can be absorbed by a magnet. Moreover, while synthetic resin such as BS resin (acrylonitrile-butadiene-styrene resin), HIPS (high impact polystyrene), PP (polypropyrene) or the like is suitable for materials of the upper and lower shells 52, 53 and the partitioning member 64, it is needless to say that other synthetic resin can be employed.

Figure 11:
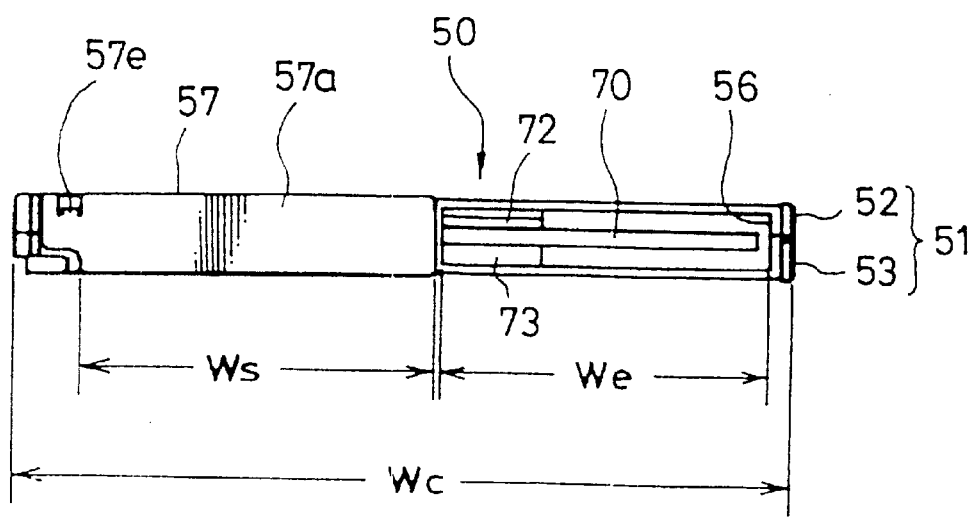
FIG. 11 is a front view showing a state that a slidable shutter of the disk cartridge shown in FIG. 8 is opened.
Figure 12:
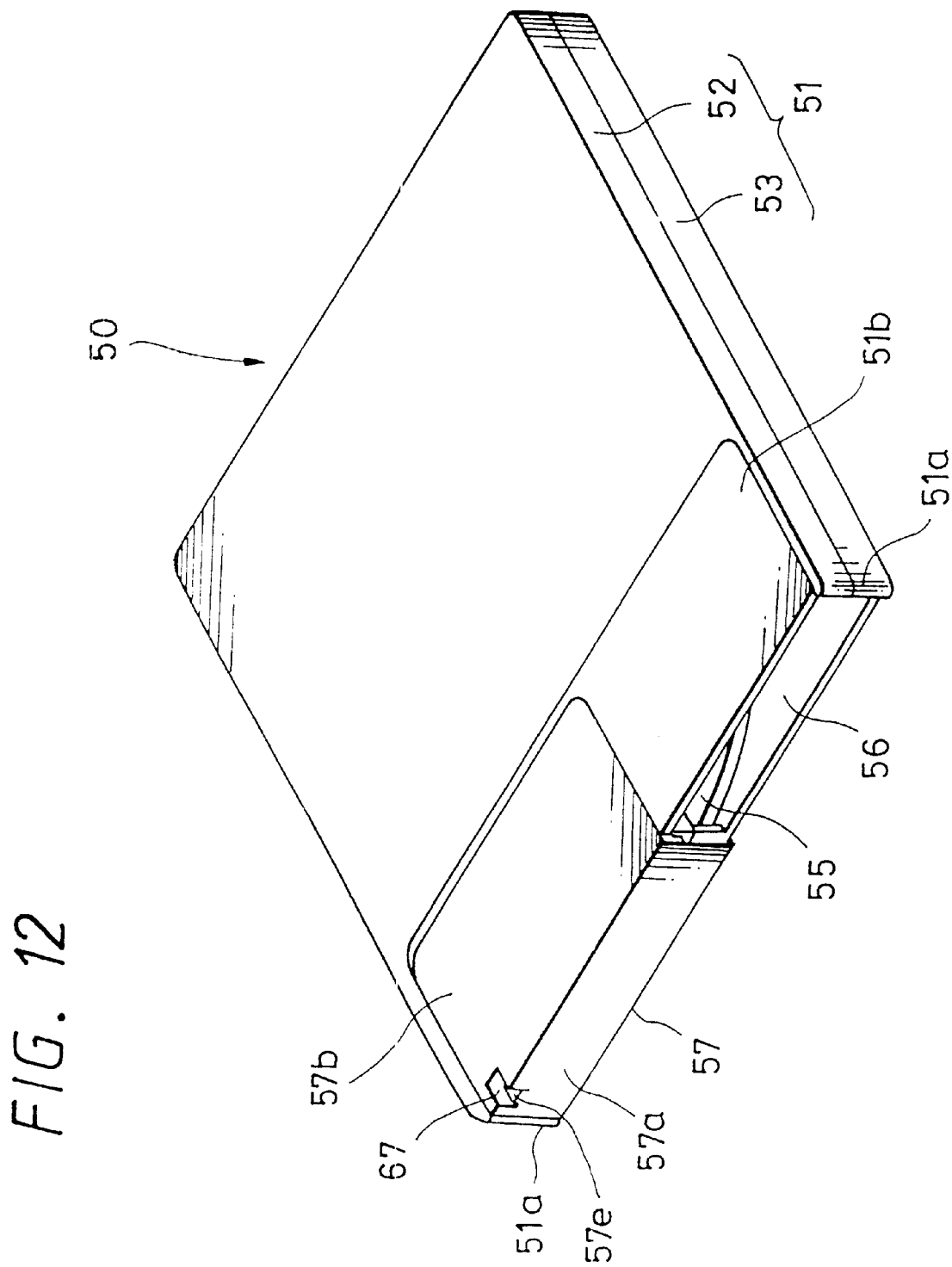
FIG. 12 is a perspective view showing a state that a slidable shutter of the disk cartridge shown in FIG. 8 is closed.

The head-positioning-mechanism insertion slot 56 of the disk cartridge 50 having the above arrangement and the slidable shutter 57 for opening and closing this slot are set so as to have the following relationship. Specifically, as shown in FIG. 11, a length We of the head-positioning-mechanism insertion slot 56 is set slightly shorter than a length Ws of the slidable shutter 57 (We<Ws). Therefore, when the slidable shutter 57 is located at an end portion where it is located when closing the slot, the head-positioning-mechanism insertion slot 56 is completely closed without any clearance, which prevents dusts and so on from intruding through the head-positioning-mechanism insertion slot 56. On the other hand, when the slidable shutter 57 is moved to an end portion where it is located when opening the slot, the head-positioning-mechanism insertion slot 56 is completely opened.

Assuming that a width-direction length of the disk cartridge 50 is Wc, then since the stopper portions 51a for preventing the movement of the slidable shutter 57 are located at both ends of the front surface of the cartridge housing 51, the length Wc of the disk cartridge 50, the length Ws of the slidable shutter 57 and the length We of the head-positioning-mechanism insertion slot 56 have the following relationship, i.e., Wc>2Ws>2We.

Figure 8:
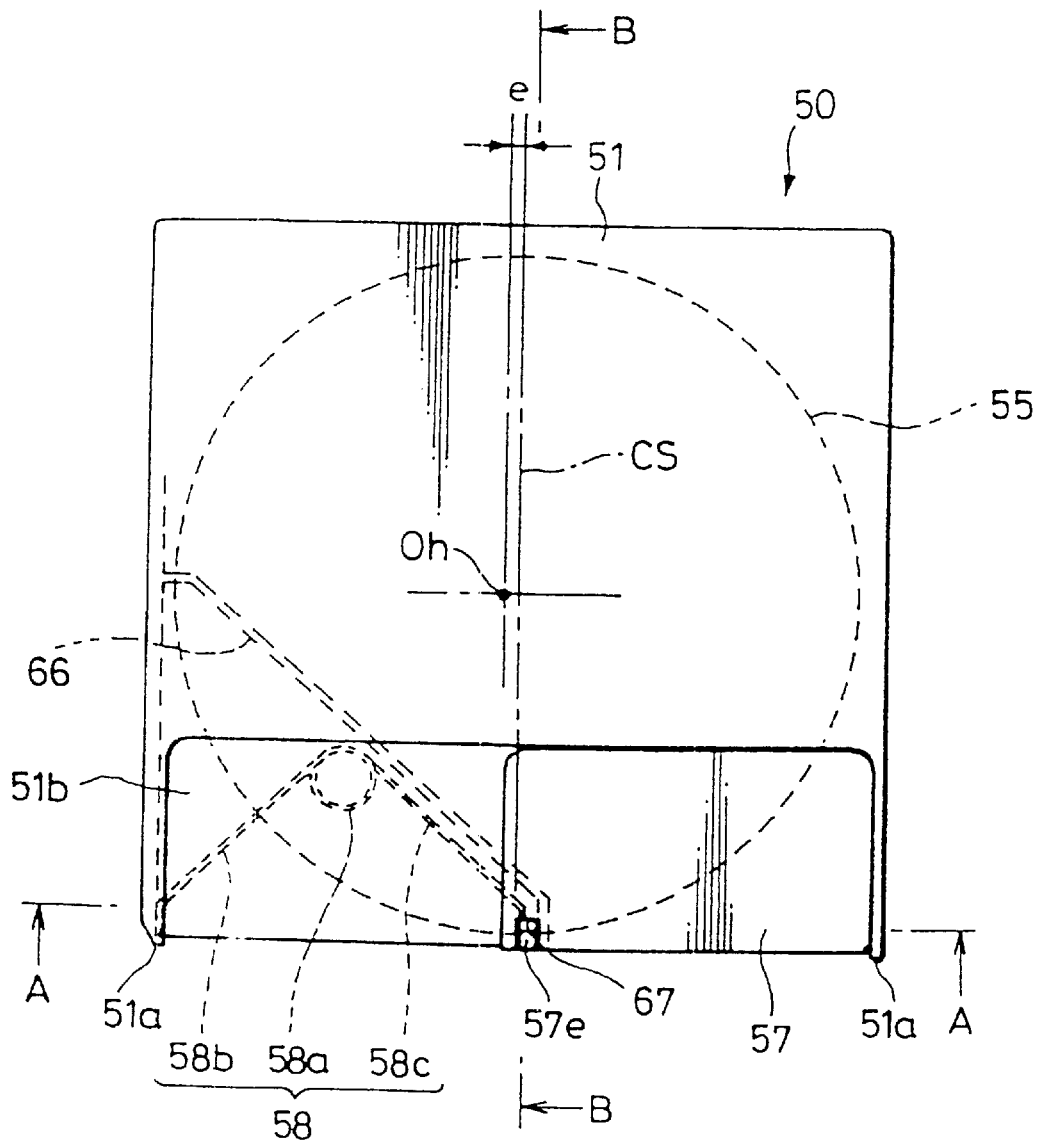
FIG. 8 is a plan view showing the disk cartridge according to the first embodiment of the present invention.
Figure 9:
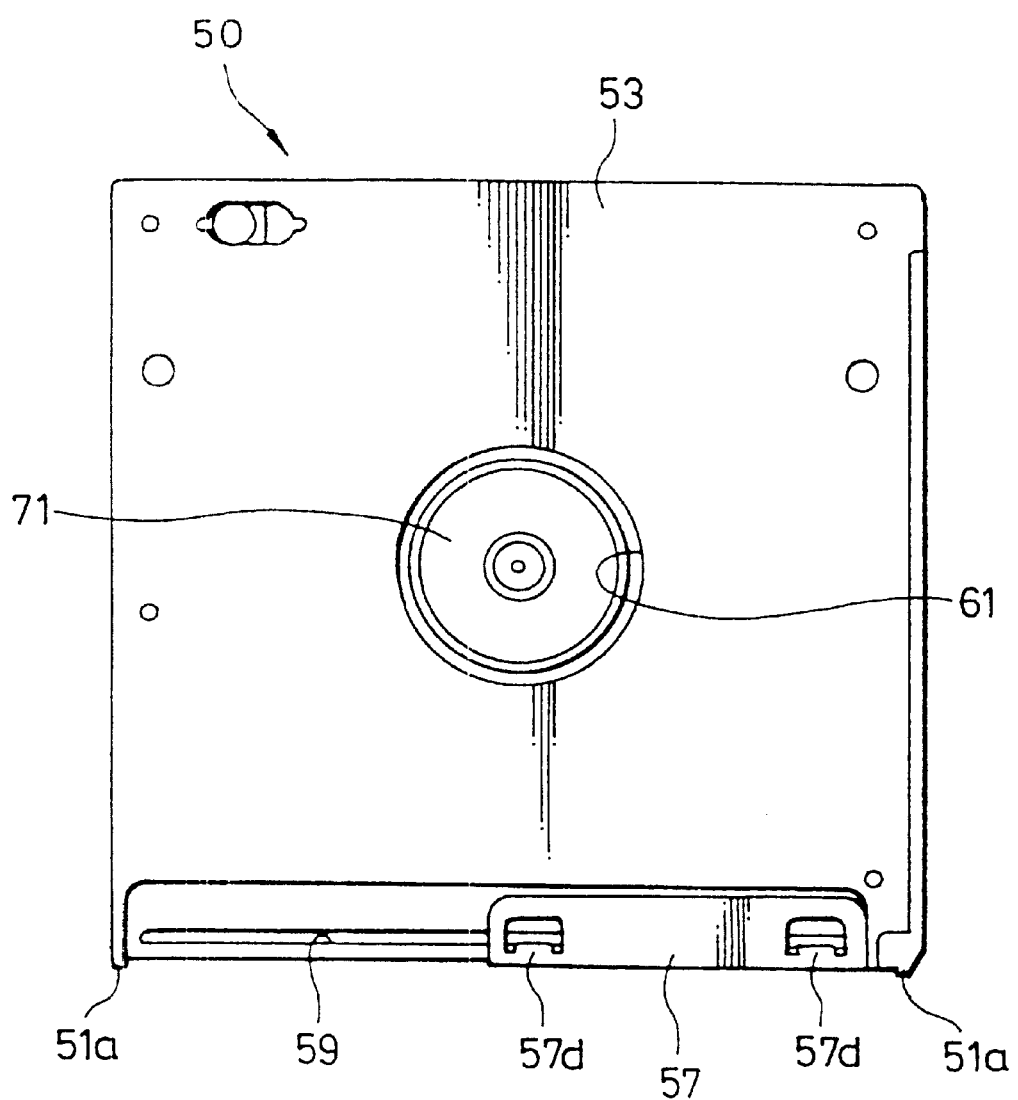
FIG. 9 is a bottom view of the disk cartridge shown in FIG. 8.
Figure 10:
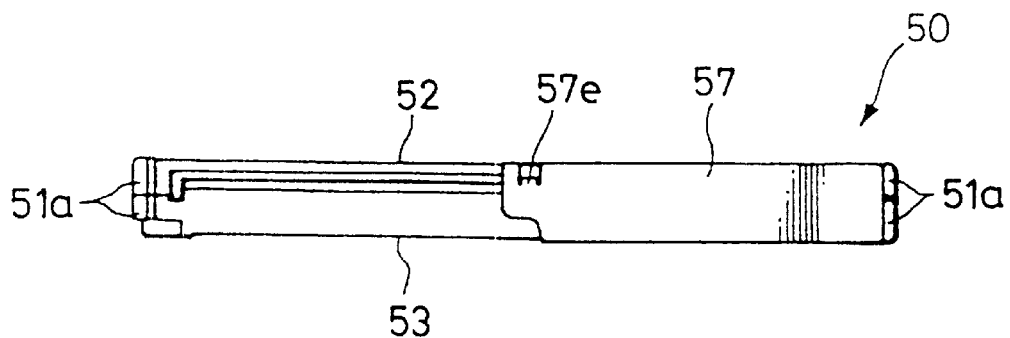
FIG. 10 is a front view showing a state that a slidable shutter of the disk cartridge shown in FIG. 8 is closed.

As shown in FIG. 8, a disk center 0h of the hard disk 55 is slightly offset from a center line CS (which is ½ of the length Wc and is hereinafter referred to as "a cartridge reference line") in the width direction of the disk cartridge 50 by an offset amount e. This offset amount e is provided so as to secure a space for a ramp described later on.

[internal arrangement of disk storage apparatus]

Figure 2:
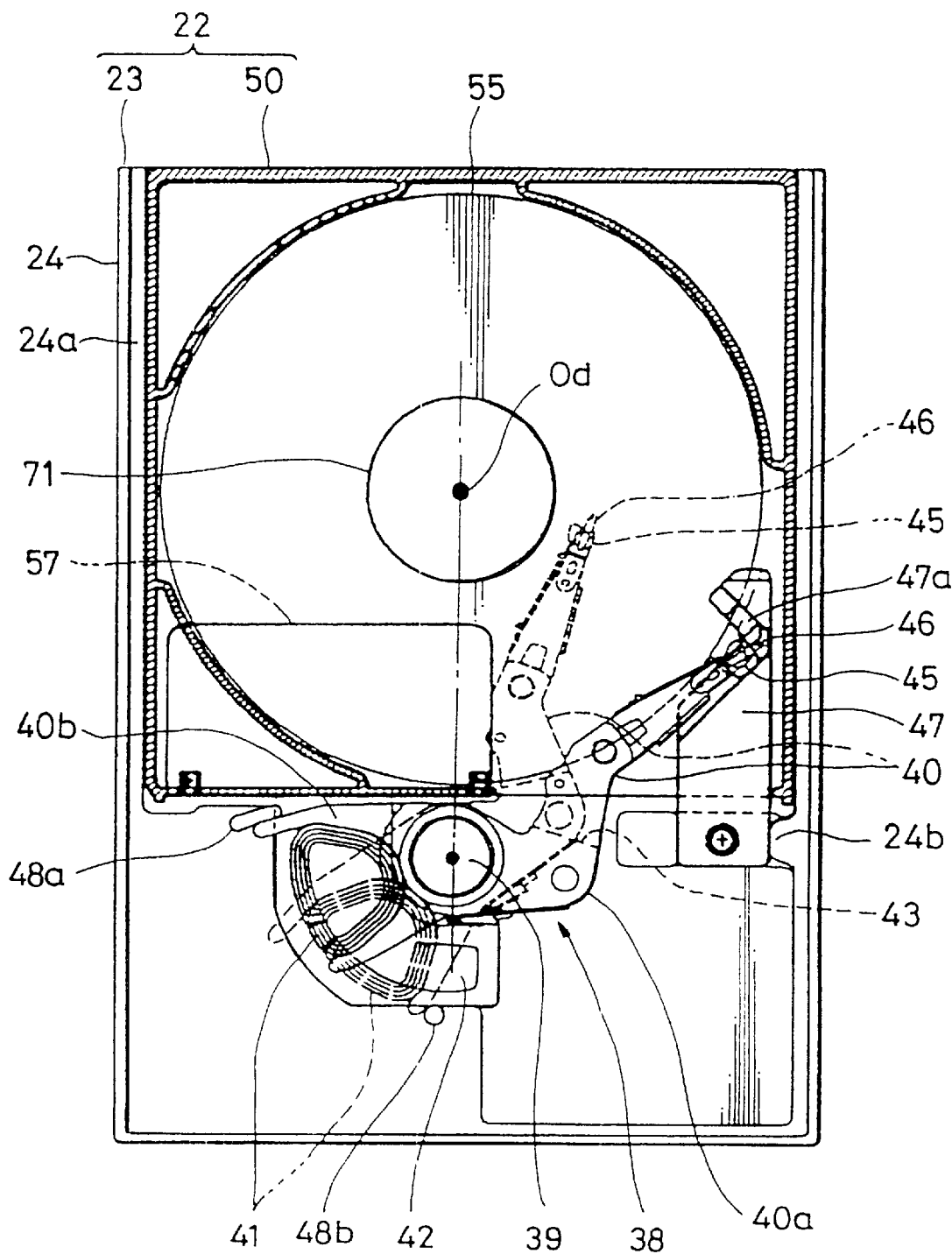
FIG. 2 is a plan and locally cross-sectional view showing the disk storage apparatus shown in FIG. 1 in a state that a disk cartridge is inserted into an apparatus body.

As shown in FIG. 2, a rotary head-positioning mechanism and the spindle motor 7 (see FIG. 22) are attached to a portion behind the cartridge accommodation chamber 24a of the apparatus body 2 onto which the disk cartridge 50 having the above arrangement is loaded.

Figure 4:
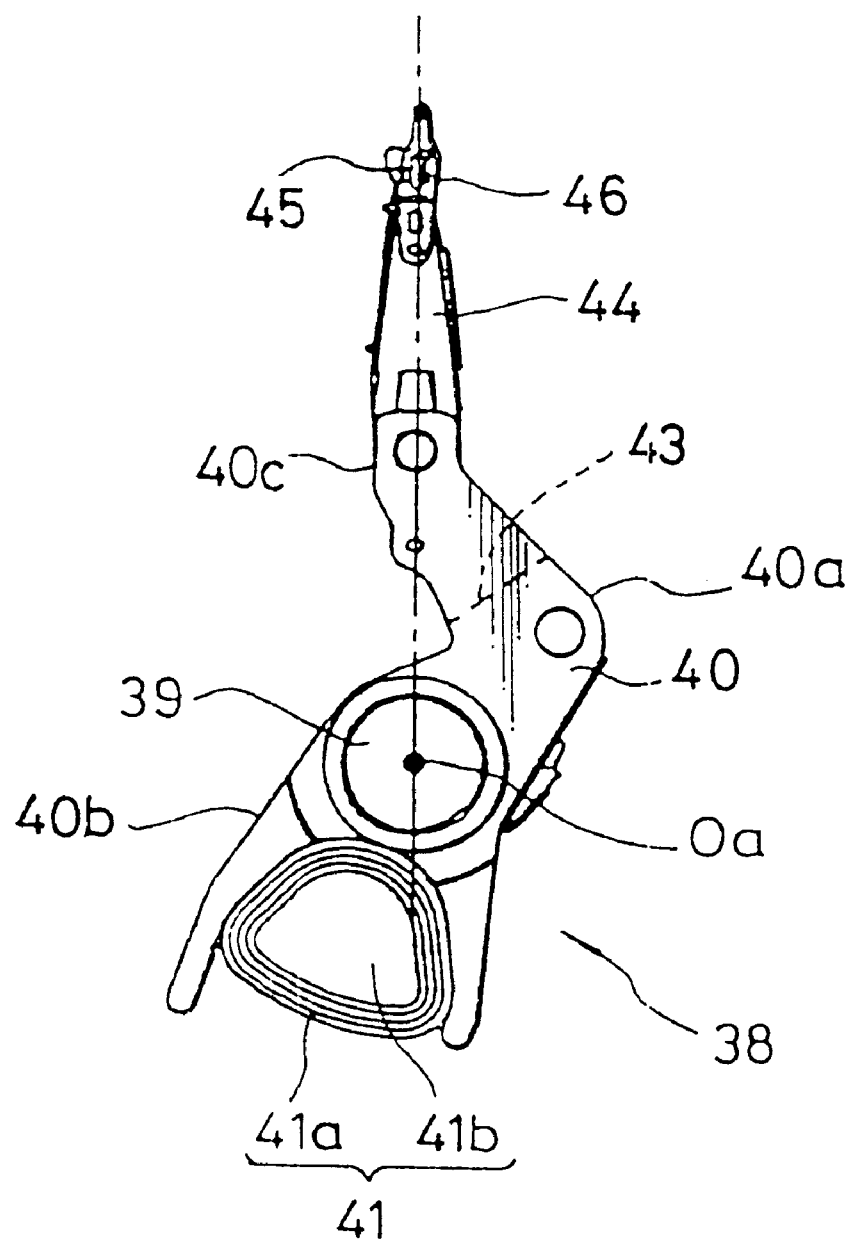
FIG. 4 is a plan view showing a rotation actuator of a rotary head-positioning mechanism shown in FIG. 2.
Figure 5:
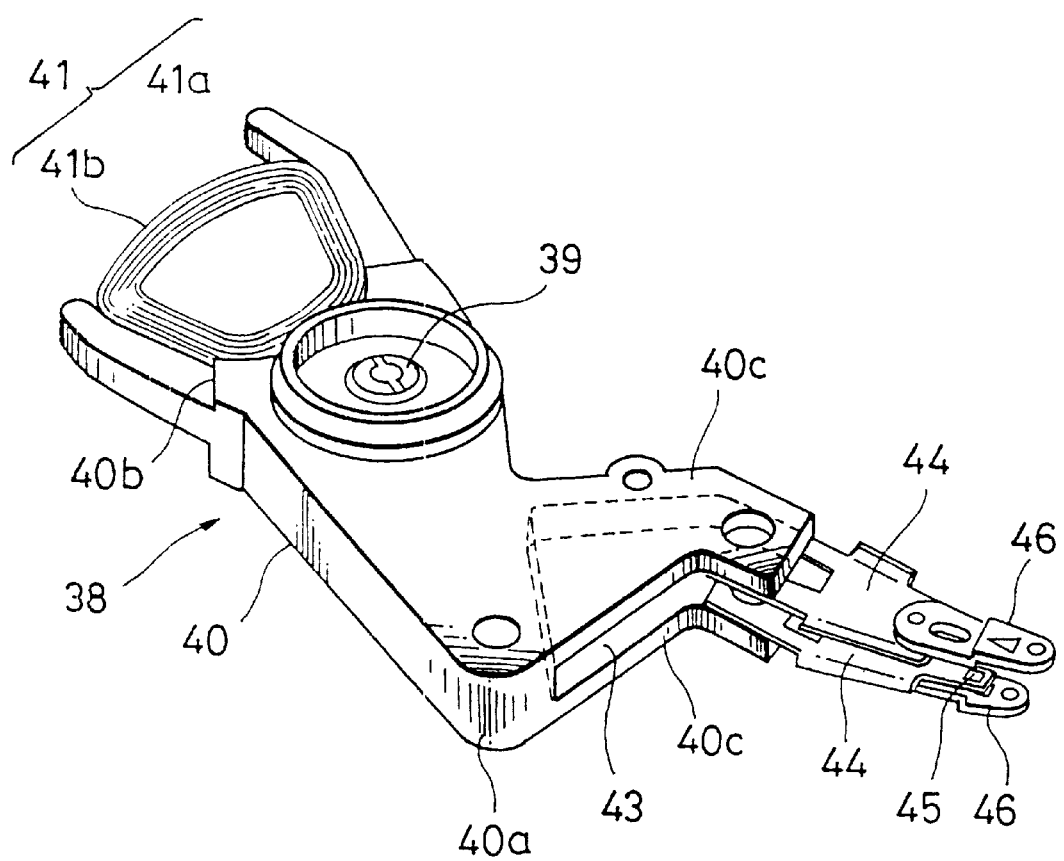
FIG. 5 is a perspective view of the rotation actuator shown in FIG. 4.

As shown in FIGS. 4, 5, the rotation actuator 38 of the rotary head-positioning mechanism has a rotary arm 40 rotatably supported on the chassis 40 by a rotation shaft 39, a drive coil 41 fixed on a branch portion 40b provided a base end side of the rotary arm 40, a magnet 42 disposed below the drive coil 41 and fixed on the chassis 24, and so on.

The drive coil 41 has a winding core 41a formed of an insulating member, and a coil wire 41b wound around the winding core 41a several times. The drive coil is attached to the rotary arm 40 with being disposed on the same plane so that an outer peripheral surface of the coil wire 41b should be in contact with an inner peripheral surface of the branch portion 40b. A bent portion 40a formed so as to be L-shaped is provided on the opposite side of the branch portion 40b of the rotary arm 40. On the tip end side of the bent portion 40a, a slit 43 extended in parallel to the surface direction and ranging from the tip end thereof to the middle portion thereof, thereby upper and lower supporting pieces 40c, 40d being formed. The hard disk 55 rotated after loaded onto the spindle motor 7 can be inserted into and drawn from the slit 43 of the rotary arm 40 by rotation of the rotation actuator 38.

Moreover, springy supporting members 44 such as gimbaled springs or the like are fixed by some fixing means such as an adhesive or the like on the respective tip end portions of upper and lower supporting pieces 40c, 40d of the rotary arm 40. Magnetic heads 45 which are one example of a recording and/or reproducing head as a head portion are fitted to the respective tip end portions of the springy supporting member 44. Moreover, load bars 46 for respectively bringing the upper and lower magnetic heads 45 away from the upper and lower information storage surfaces of the hard disk 55 by elastically deforming the springy supporting members 44 upward and downward upon retraction of the rotation actuator 38 are fitted to the respective tip end portions of the springy supporting members 44.

When the upper and lower load bars 46 are landed on upper and lower ramps 47a of the ramp member 47 fixed on the chassis 24, a vertical-direction space between the upper and lower load bars is enlarged dna hence the upper and lower magnetic heads 45 are brought away from each other. The ramp member 47 is screwed and fixed on a stand 24b provided on the chassis 24 by a fitting screw 48 in a state the ramp 47a is faced to the cartridge insertion slot 27. A notch into which the hard disk 55 is inserted is provided at a tip end portion of the ramp member 47, and the upper and lower ramps 47a are provided on upper and lower sides of the notch.

Thus, when the disk cartridge 50 is loaded, the ramp 47a side of the ramp member 47 is inserted through the head-positioning-mechanism insertion slot 56 into the disk accommodation chamber 54. As a result, a part of the outer peripheral edge of the hard disk 55 is inserted between the upper and lower ramps 47a of the ramp member 47, and a tip end portion of the lower shell 53 is brought to a space set below the lower ramp 47a.

The rotation actuator 38 having the above arrangement is restricted in its rotation range by a pair of portion restricting pieces 48a, 48b provided on the chassis 24. The pair of position restricting pieces 48a, 48b are disposed away from the branch portion 40b at a predetermined interval. The one position restricting piece 48a restricts movement of the magnetic head 45 outward in the radial direction of the disk, and the load bar 46 is slidably moved along the ramp 47a and kept. The other position restricting piece 48b restricts movement thereof inward in the disk-radius direction, thereby preventing the magnetic head 45 from being brought in contact with the metal hub 71.

The magnetic head 45 and the drive coil 41 of the rotation actuator 38 are connected to a control device, not shown, and a rotation amount of the rotary arm 40 is controlled based on a control signal output from the control device. Informations previously stored in the upper and lower information storage surfaces of the hard disk 55 are reproduced by the magnetic heads 45.

The magnet 42 is formed so as to be arc-shaped in accordance with the movement of the drive coil 41 rotated integrally with the rotary arm 40. The magnet 42 is fitted to the chassis 24 so that the drive coil 41 is located between the magnet and a steel plate.

Thus, the bent portion 40a of the rotary arm 40 is set on a segment between a rotation center Oa of the rotation actuator 38 of the rotary head-positioning mechanism, and a concave side of the bent portion 40a permits the rotary arm to be prevented from being brought in contact with a peripheral portion of the head-positioning-mechanism insertion slot 56 as shown in FIG. 2 and so on. The drive coil 41 is fitted on an extended line of the segment between the rotation center Oa and the magnetic head 45.

Figure 22:
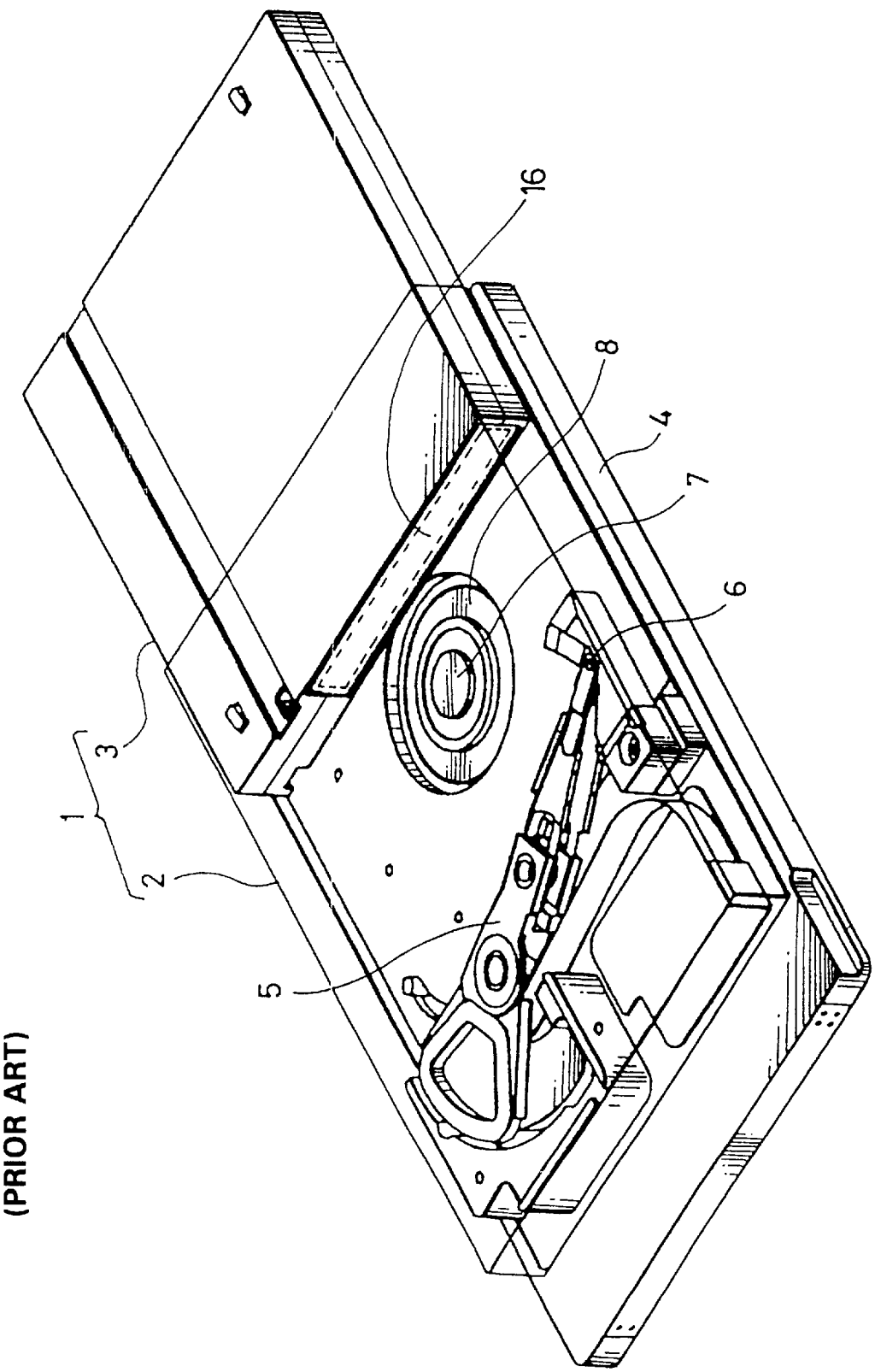
FIG. 22 is a perspective view showing a conventional disk storage apparatus.
Figure 23:
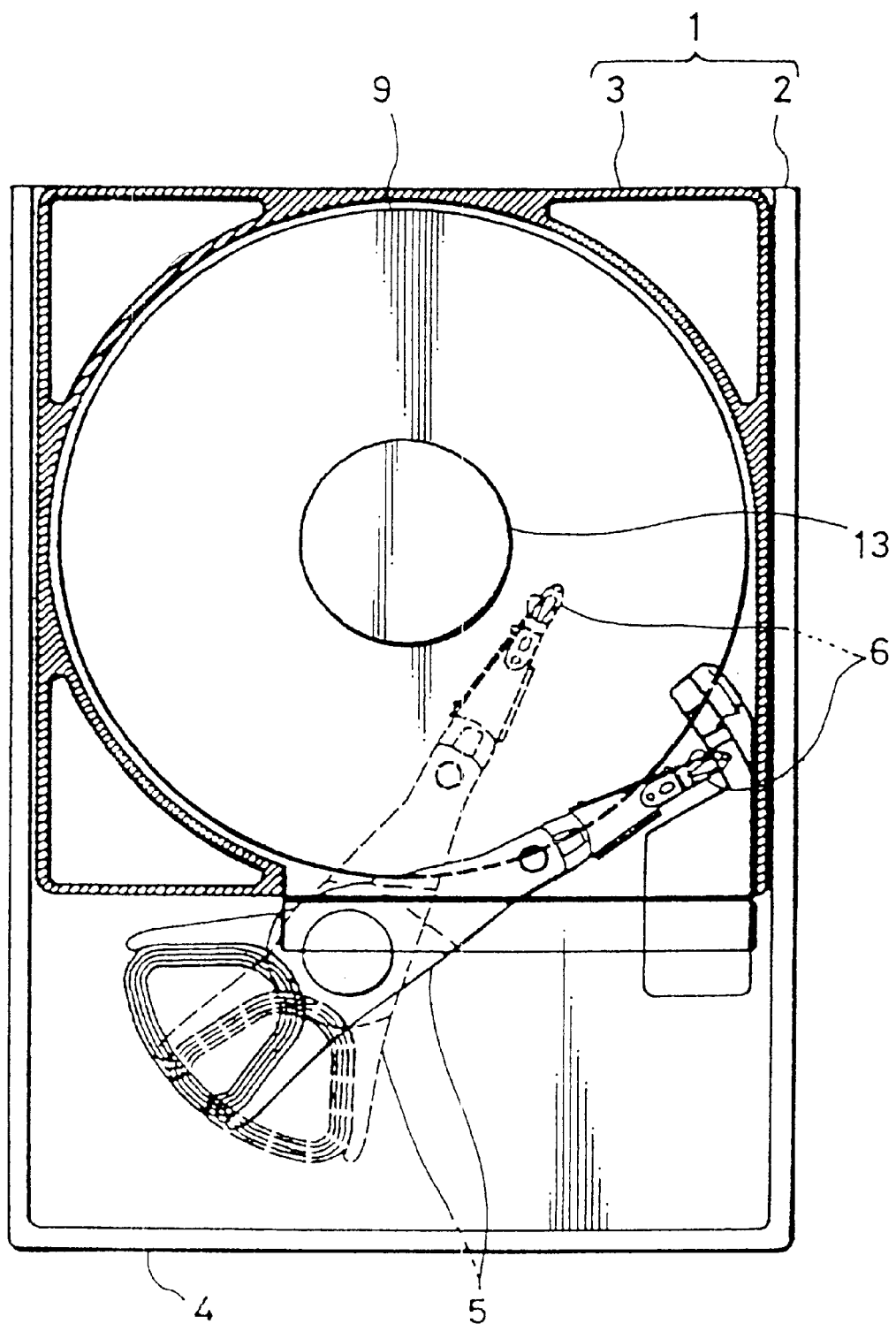
FIG. 23 is a plan and cross-sectional view showing a disk cartridge inserted into the disk storage apparatus shown in FIG. 22.
Figure 24:
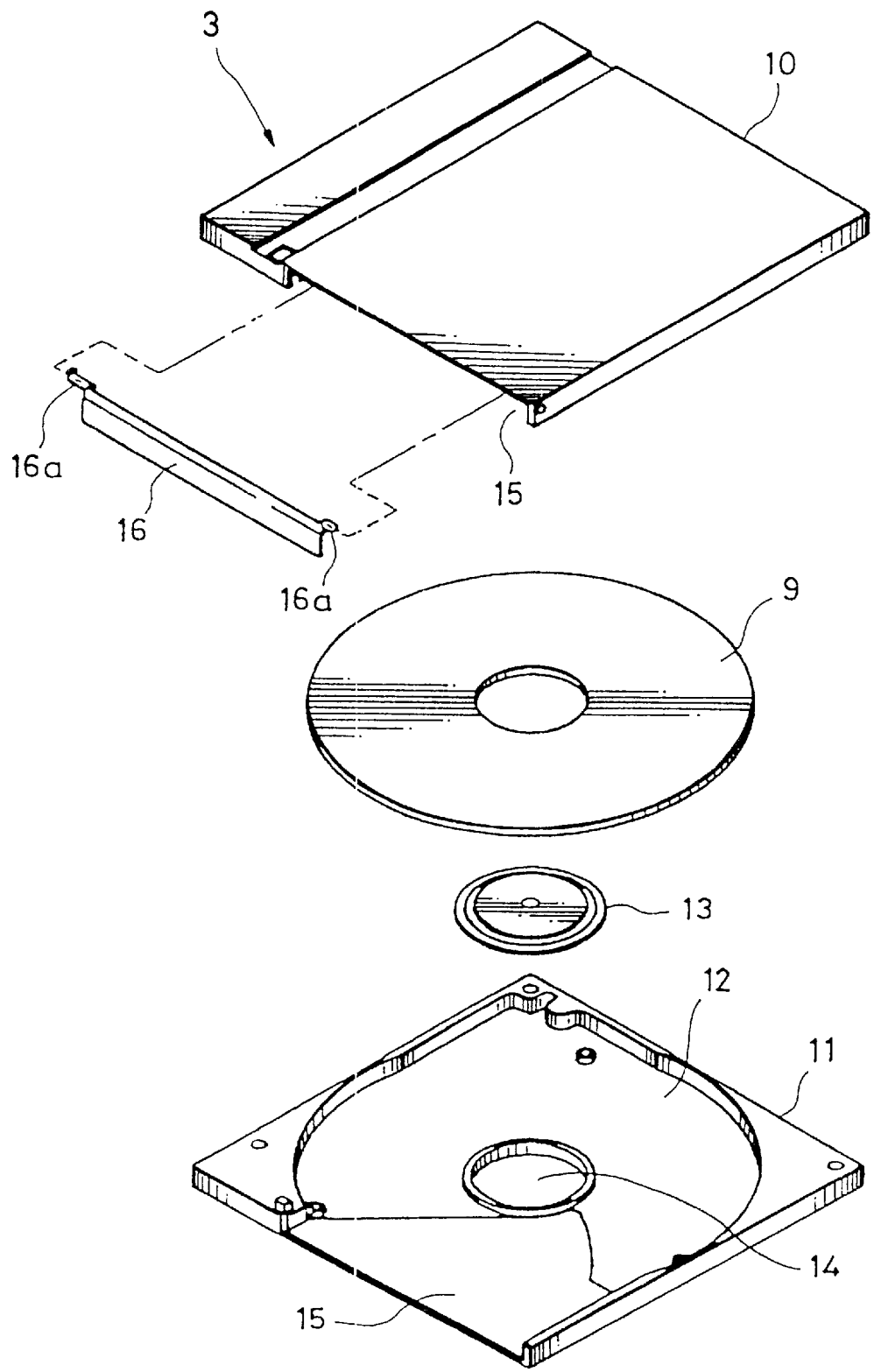
FIG. 24 is an exploded, perspective view showing a conventional disk cartridge.
Figure 25:
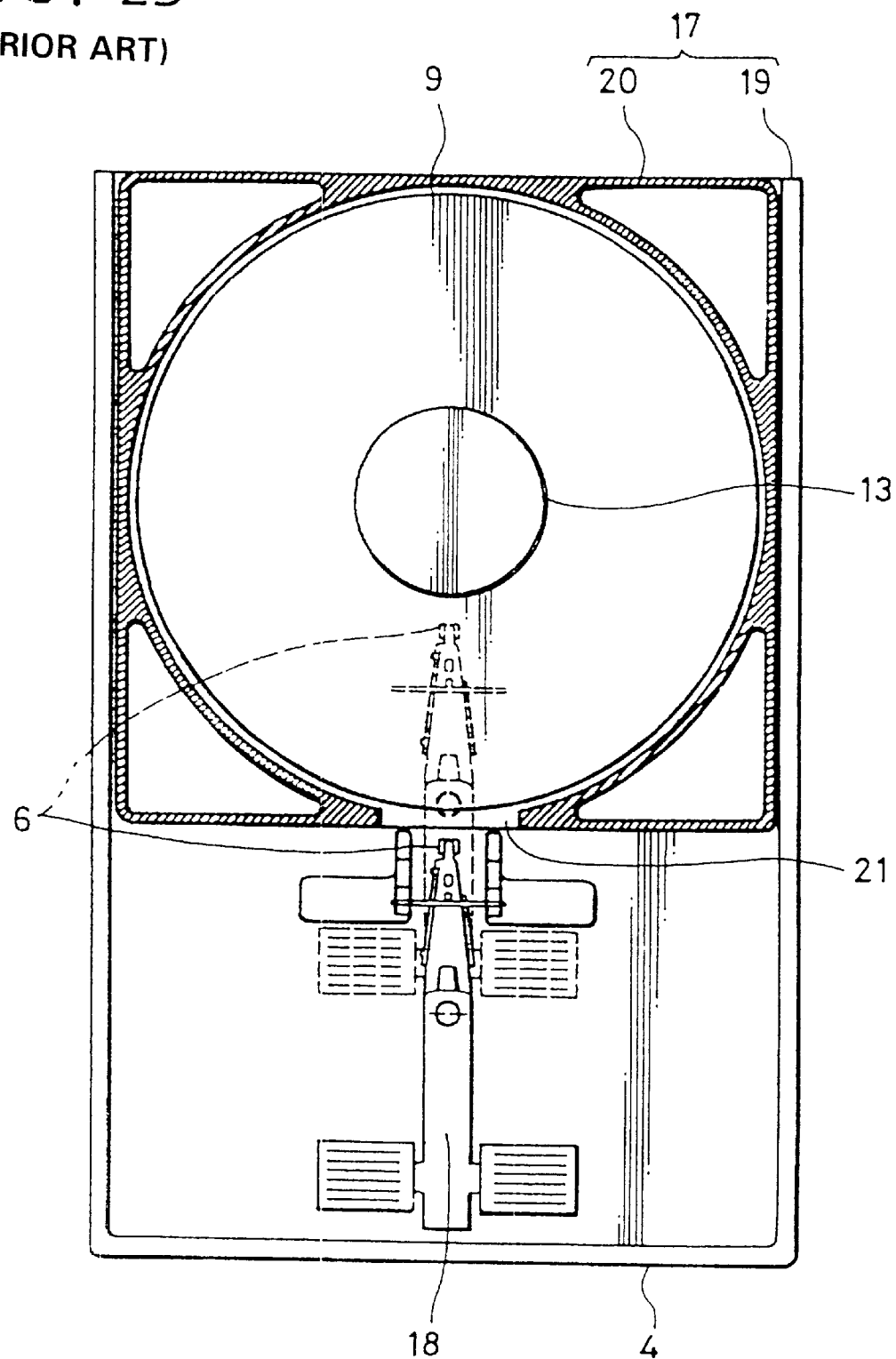
FIG. 25 is a plan and cross-sectional view showing another example of a conventional disk storage apparatus in a state that a disk cartridge is inserted into an apparatus body having a linear-movement actuator.

A spindle motor aperture is bored through a substantial center of the cartridge accommodation chamber 24a, onto which the disk cartridge 50 is loaded, of the chassis 24 (see FIG. 22). Through the spindle motor, a hub drive shaft which is a rotation portion of the spindle motor 7 supported on the lower surface of the chassis 24 so as to be able to be lifted up and down is lifted up an down, thereby being brought into and out of the disk cartridge. The hub drive shaft of the spindle motor 7 is a turntable for chucking the hard disk 55 and has a magnet buried on its upper surface for attracting the metal hub 71.

Before the disk cartridge 50 is loaded and when the disk cartridge is ejected, the hub drive shaft of the spindle motor 7 is lifted downward. When the disk cartridge 50 is loaded, the hub drive shaft is lifted to a position above the chassis 24 by a spindle motor lifting mechanism, not shown, thereby being pierced through the spindle motor aperture. Then, the hub drive shaft is brought in contact with the metal hub 71 engaged with the hub aperture 61 of the lower shell 53. Thus, the metal hub 71 is attracted by the hub drive shaft of the spindle motor 7 and hence the hard disk 55 is chucked by the turntable, thereby being rotated together.

Figure 3:
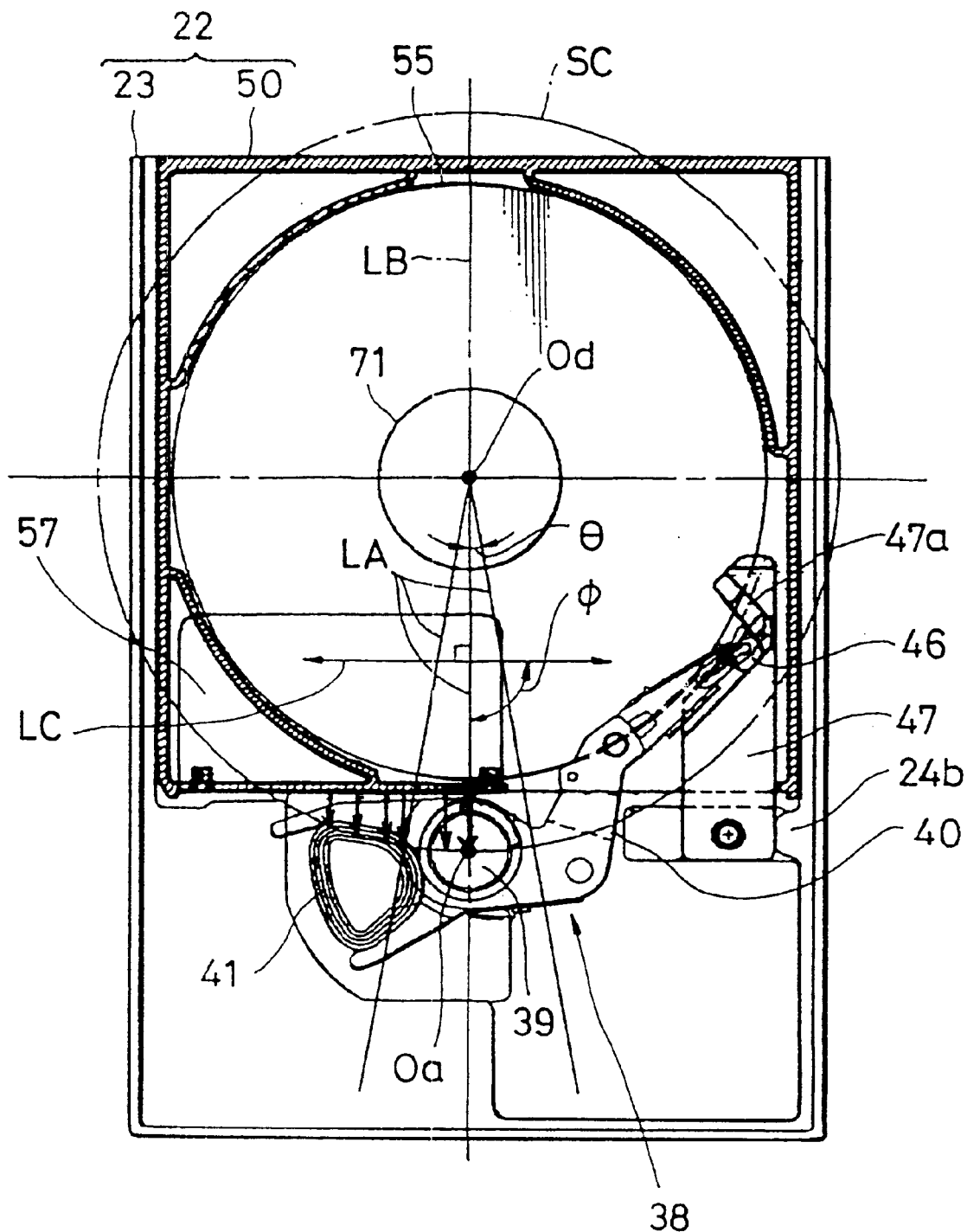
FIG. 3 is a diagram used to explain a relationship between a rotary head-positioning mechanism of the disk storage apparatus shown in FIG. 2 and the disk cartridge.

As shown in FIG. 3, a segment LA between the rotation center od of the spindle motor 7 and the rotation center Oa of the rotation actuator 38 and a reference line LB are set so as to be matched with each other. Simultaneously, a plane FD of a front surface on the slidable shutter 57 side of the disk cartridge 50 loaded onto the cartridge accommodation chamber 24a is set so as to perpendicularly cross a segment LA between the rotation center Od and the rotation center Oa.

Moreover, a segment LC representing a direction in which the slidable shutter 57 of the disk cartridge 50 is moved is set so as to lie at right angles to the segment LA between the rotation center Od and the rotation center Oa. Therefore, the front surface FD on the slidable shutter 57 side of the disk cartridge 50 is in parallel to the segment LC representing the direction of movement of the slidable shutter 57. The segment LC representing the movement direction of the slidable shutter 57 and the reference line LB lie at right angles to each other. As described above, since an angle formed by the segment LA between the rotation center Od of the spindle motor 7 and the rotation center Oa of the rotation actuator 38 and the segment LC representing the direction of movement of the slidable shutter 57 is set to 90°, a distance between the slidable shutter 57 and the rotation center Oa can be set maximum.

On the other hand, if an angle φ formed by the segments LA and LC is smaller than 90°, then the distance between the slidable shutter 57 and the rotation center Oa becomes shorter as the angle becomes smaller. Therefore, in this case, a clearance between the rotation actuator 38 and the slidable shutter 57 becomes narrower.

The rotary head-positioning mechanism is formed of the above rotation actuator 38 and the ramp member 47.

[operation of disk storage apparatus and disk cartridge]

The removable disk storage apparatus 22 having such arrangement can be used as follows. In a state shown in FIG. 1, the disk cartridge 50 is inserted into the cartridge insertion slot 27 of the apparatus body 23 with the slidable shutter 57 side thereof being faced thereto, and then the disk cartridge 50 is pushed to a predetermined position. In accordance with this operation, the slidable shutter 57 of the disk cartridge 50 is automatically opened by the shutter opening and closing mechanism.

At this time, the opening and closing arm 30 is rotated in response to an insertion amount of the disk cartridge 50. Then, the opening and closing pin 33 provided at the tip end portion of the opening and closing arm 30 is engaged with the operation concave portion 67 of the slidable shutter 57, thereby the slidable shutter 57 being moved horizontally to open the head-positioning-mechanism insertion slot 56. Thus, as shown in FIG. 2, the magnetic head 45 side which is the tip end of the rotation actuator 38 and the ramp 47a side of the ramp member 47 are inserted into the disk accommodation chamber 54 through the head-positioning-mechanism insertion slot 56.

As a result, a part of the outer peripheral edge of the hard disk 55 rotatably accommodated in the disk accommodation chamber 54 of the disk cartridge 50 is brought into the slit 43 of the rotary arm 40 and the slit of the ramp member 47. However, since the upper and lower load bars 46 are respectively supported by the upper and lower ramps 47a of the ramp member 47, the elastic supporting members 44 fitted to the tip ends of the bent portions 40a of the rotary arm 40 and the upper and lower magnetic heads 45 fitted to the tip ends of the elastic supporting members 44 are prevented from being brought in contact with the hard disk 55.

Simultaneously with this operation, when the disk cartridge 50 is inserted to a predetermined position, the metal hub 71 of the hard disk 55 is located above the rotation portion of the spindle motor 7. Therefore, if the spindle motor 7 is lifted up, the metal hub 71 is attracted by a magnetic force of the magnet buried in the hub drive shaft thereof and then the spindle motor 7 chucks the hard disk 55 by employing the attracting force of the magnet. Thus, the hard disk 55 can be rotated integrally with the spindle motor.

When the spindle motor 7 is rotated and an angular velocity of the hard disk 55 becomes constant, the rotation actuator 38 is driven. Thus, the load bar 46 provided at the tip end of the rotation actuator 38 is slid on the ramp 47a and then the upper and lower magnetic heads 45 are moved toward the hard disk 55.

As a result, the magnetic heads 45 are kept in a state that it is floated over the information storage surfaces by several tens of nm by an aerodynamic effect. When the rotation actuator 38 is rotated, the magnetic heads 45 are moved over the information storage surfaces of the disk member 70 with being floated. Thus, the informations previously recorded on the information storage surfaces are read out by the magnetic heads 45 to reproduce the informations.

In this case, even when the magnetic heads 45 are moved inward in the radius direction of the hard disk 55, since the rotary arm 40 has the bent portion 40a, the rotary arm 40 can be sufficiently inserted into a predetermined innermost periphery position without being brought in contact with the periphery edge portion of the head-positioning-mechanism insertion slot 56 of the disk cartridge 50.

Moreover, since, as shown in FIG. 3, the angle formed by the segment LA between the rotation center od of the spindle motor 7 and the rotation center Oa of the rotary head-positioning mechanism and the segment LC representing the direction of the parallel movement of the slidable shutter 57 is set to 90°, the distance between the slidable shutter 57 and the rotation center Oa can be set maximum. Therefore, even if the accuracy of the slidable shutter 57 is a little rough, it can be used, and it is possible to prevent the manufacturing costs of the disk cartridge 50 from being increased due to a higher accuracy of its dimension.

Moreover, it is possible to prevent the rotation actuator 38 and the slidable shutter 57 from interfering each other because of a narrow clearance between the rotation actuator 38 and the slidable shutter 7. Limitation of a shape of the rotation actuator 38 is reduced to thereby prevent a performance of the apparatus from being lowered because of this limitation. Thus, it is possible to secure a normal operation of the apparatus.

As shown in FIG. 3, the position of the rotation center Oa of the rotation actuator 38 is limited to points on a circle SC (hereinafter referred to as a "reference circle") employing the rotation center Od of the spindle motor 7 as its center. In theory, the rotation center Oa may be located at any of the points as long as they are on the reference circle SC.

However, practically, as described above, if the segment LA between the rotation center Oa and the rotation center Od is inclined relative to the reference line LB of the apparatus body 23 and an angle θ formed by both of the segment and the reference line is set larger than 0°, then the distance between the rotation center Oa of the rotation actuator 38 and the slidable shutter 57 becomes shorter, which narrows the clearance therebetween. Therefore, it is not preferable to increase the angle θ formed by the reference line LB and the segment LC, and hence the tolerance of the angle θ is about 10° in the positive and negative direction.

A positional relationship between the rotation center Oa of the rotation actuator 38 and the rotation center Od of the spindle motor 7 will be described with reference to FIG. 6. When the rotation actuator 38 is provided on one side of apparatus body 23 with respect to the reference line LB with the rotation center OA thereof being offset by the angle θ, then the following relationship is established.

Figure 6:
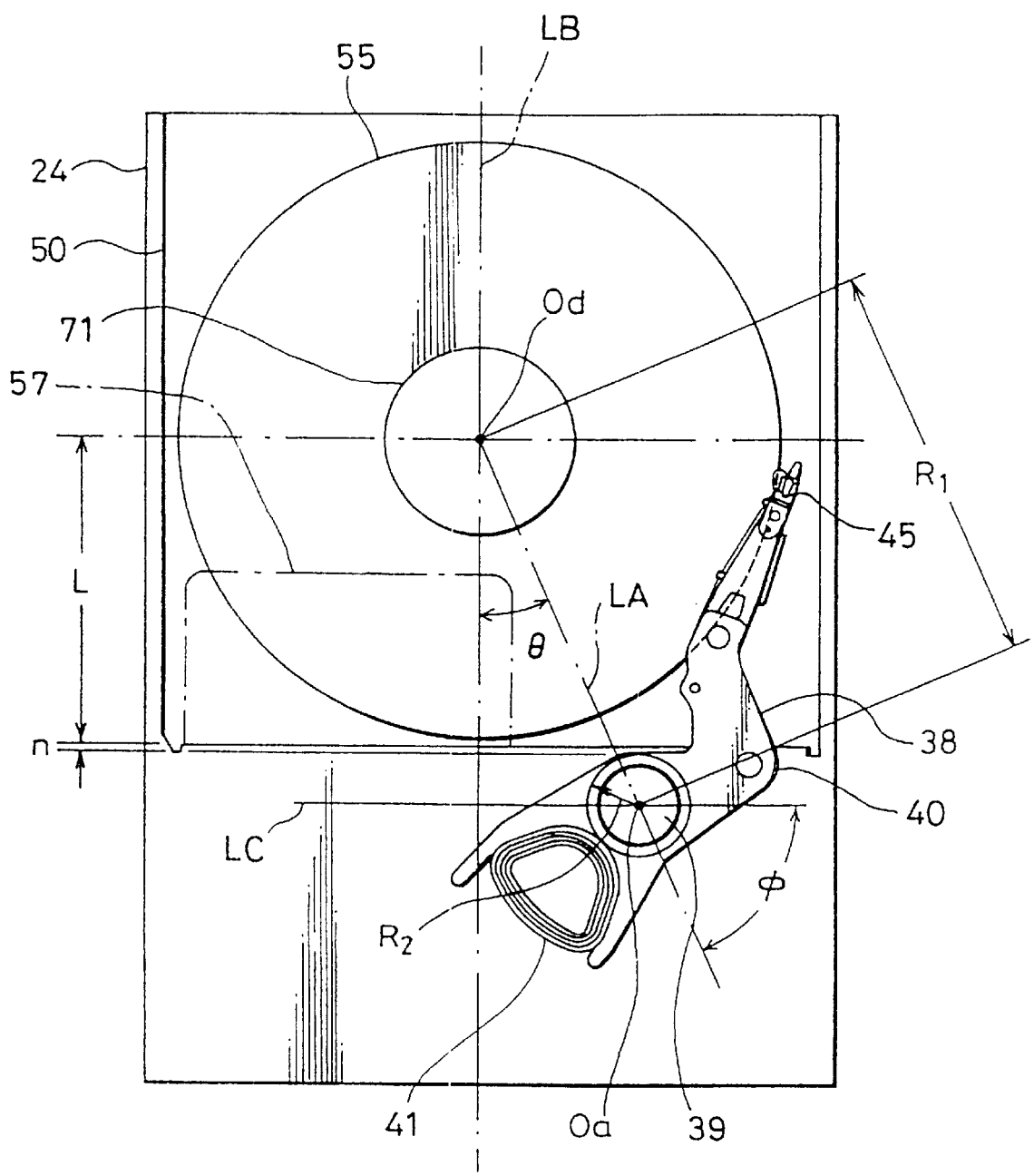
FIG. 6 is a diagram used to explain a state that the rotation head of the rotary head-positioning mechanism shown in FIG. 2 is offset from a reference line of the apparatus body toward a side thereof.

In FIG. 6, reference symbol L depicts a distance from the rotation center Od of the spindle motor 7 to a front end surface of the head-positioning-mechanism insertion slot 56 of the cartridge housing 51, reference numeral $R_1$ depicts a distance from the rotation center Od of the spindle motor 7 to the rotation center Oa of the rotation actuator 38, and reference numeral $R_2$ depicts a radius of the rotation shaft 39 of the rotation actuator 38. Reference symbol θ depicts an angle formed by the segment LA between the rotation center Oa and the rotation center Od and the reference line LB. Reference symbol φ depicts an angle formed by actuator 38. Reference symbol θ depicts an angle formed by the segment LA between the rotation center Oa and the rotation center Od and the segment LC representing the direction of the movement of the slidable shutter 57.

The following relationship between the length and the angle is established.

Specifically, θ satisfies $R_1 \cos\theta > L + R_2$. If this is expressed by using φ, then the above expression can be expressed by $R_1 \sin\phi > L + R_2$.

A difference between a left-handed member side of the above expression and a right-handed member side thereof is a clearance n between the front end surface of the head-positioning-mechanism insertion slot 6 of the cartridge housing 51 and the outer peripheral surface of the rotation shaft 39.

Therefore, if the clearance n is added to the above expression, then the above expression can be expressed as follows:

$$R_1 \cos \theta = L + R + n; \text{ or}$$

$$R_1 \sin \phi = L + R_2 + n.$$

If the angle θ formed by the segment LA and the reference line LB becomes smaller, the value of the clearance n becomes larger, i.e., the clearance becomes wider. If on the other hand the angle θ formed by the segment LA and the reference line LB becomes larger, the value thereof becomes smaller, i.e., the clearance becomes narrower.

Figure 7:
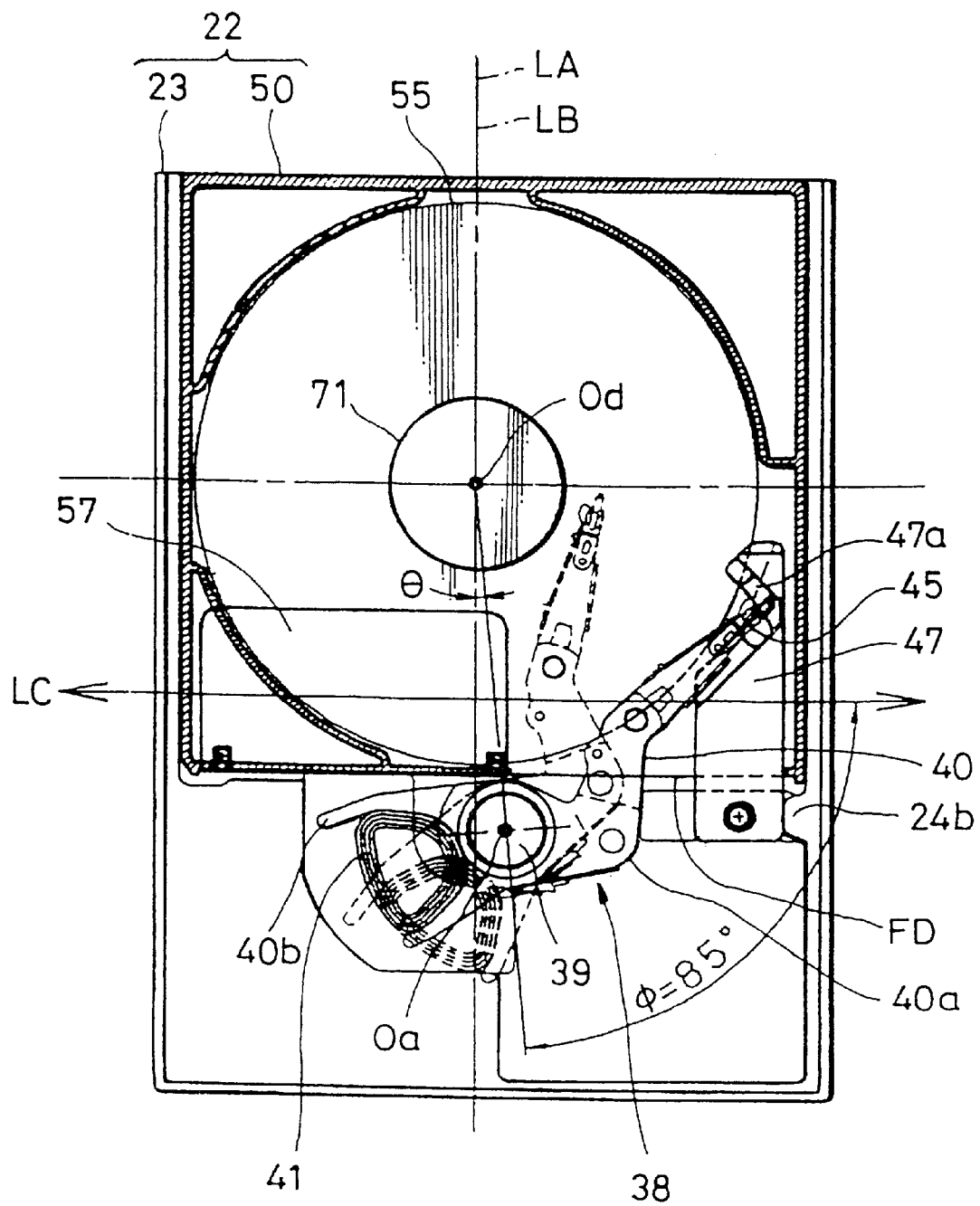
FIG. 7 is a diagram used to explain a state that the rotation head of the rotary head-positioning mechanism shown in FIG. 2 is offset from a reference line of the apparatus body toward a side thereof by an angle of 5°.

If, as shown in FIG. 7, values are substituted for symbols in the above expression, the following values can be obtained. In FIG. 7, the reference line LB and the direction of the parallel movement of the slidable shutter 57 lie at right angles to each other, while the angle θ is set to 5° and the angle φ formed by the segment LA between the rotation center Oa and the rotation center Od and the segment LC representing the movement direction of the slidable shutter 57 is set to 85°.

In this case, if the distance $R_1$ from the rotation center Oa to the rotation center Od is set to 40 mm, then the clearance n becomes narrower by about 0.35 mm as compared with that obtained when the angle φ is set to 90° (i.e., the angle θ is set to 0°). If the angle θ exceeds 10°, the clearance n remarkably becomes larger. Therefore, the position of the rotation center Oa of the rotation actuator 38 is preferably set so that the angle θ formed by the reference line LB and the segment LA should be within the range from 0° to 10°.

This relationship is similar to the angle φ formed by the segment LA between the rotation center Oa of the rotation actuator 38 and the rotation center Od of the spindle motor 7.

Specifically, even if the slidable shutter 57 is formed with being slightly deformed and hence the segment LC is set so as to be inclined relative to the segment LA, then the distance between the rotation center Oa of the rotation actuator 38 and the slidable shutter 57 becomes shorter, which leads to a narrower clearance.

Therefore, it is not preferable that the angle φ of the segment LC relative to the reference ling LB, and the limit of the tolerance of the angle is about 80° in each of the positive and negative directions similarly. Therefore, the rotation center Oa of the rotation actuator 38 is positioned so that the angle φ formed by the segments LA, LC should be within the range from 80° to 90°.

Such arrangement allows the distance between the rotation center Oa of the rotation actuator 38 and the slidable shutter 57 to be set to a necessary and sufficient distance.

According to the disk cartridge 50 of this embodiment, since the springy body 58 for biasing the slidable shutter 57 and the hard disk 55 are partitioned by the partitioning member 64 and hence prevented from being positioned on the same plane, it is possible to set a movement amount of the slidable shutter 57 longer. Therefore, it is possible for the slidable shutter to reliably open and close the head-positioning-mechanism insertion slot 56 after being moved by a long distance, and it is possible to reliably prevent the dusts from entering the disk cartridge. Moreover, since the disk cartridge 50 can employ the slidable shutter while the disk storage apparatus employs the rotation actuator 38, it is difficult for the dust to enter the disk cartridge 50, which can improve the reliability of the recording and/or reproduction. Since the shutter opening and closing rotation shaft required by the conventional rotary shutter is not required, it is possible to simplify an arrangement of the disk cartridge and to make the disk cartridge thinner.

Moreover, since the torsion coil spring 58 of the slidable shutter 57 and the hard disk 55 are prevented from interfering each other, the torsion coil spring 58 is prevented from being brought in contact with the hard disk 55 to thereby breaking the information storage surface and the magnetic head 45. Since the torsion coil spring 58 is located in a dedicated chamber by the partitioning member 64, abrasion powers produced from a slidable contact surface and resulting from an elastic deformation of the torsion coil spring 58 are prevented from directly falling on the information storage surfaces of the hard disk 55. Therefore, the abrasion powders are prevented from disturbing an operation of stably floating the magnetic heads 45 and from breaking the magnetic heads 45 and the hard disk 55.

[disk storage apparatus according to second embodiment]

In a removable disk storage apparatus 74 according to a second embodiment of the present invention shown in FIGS. 17 to 21, the rotation center Oa of the rotary head-positioning mechanism is largely offset from the reference line LB of the apparatus body 23 toward one side, and the rotation center Oa is set in the vicinity of the center of a head-positioning-mechanism insertion slot 81 of a disk cartridge 80.

Figure 17:
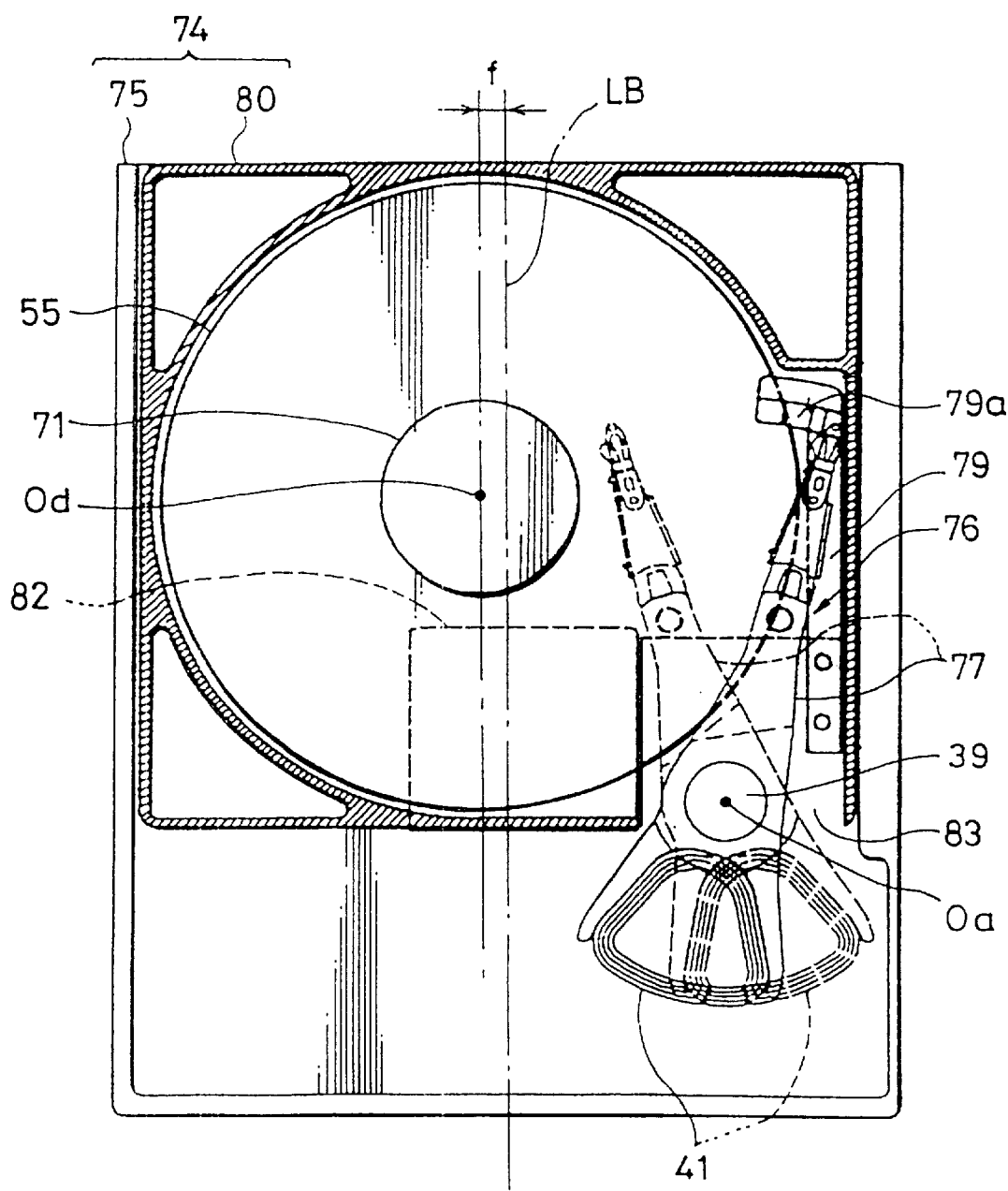
FIG. 17 is a plan and locally cross-sectional view showing a disk storage apparatus according to a second embodiment of the present invention in a state a rotation actuator of a rotary head-positioning mechanism is inserted into a disk cartridge loaded onto the disk storage apparatus having an inline type actuator.

As shown in FIG. 17, the removable disk storage apparatus 74 has an apparatus body 75 and the disk cartridge 80. The rotary head-positioning mechanism employs an inline-type actuator 76 which serves as the rotation actuator and can be rotated by a rotation shaft 39.

Figure 18:
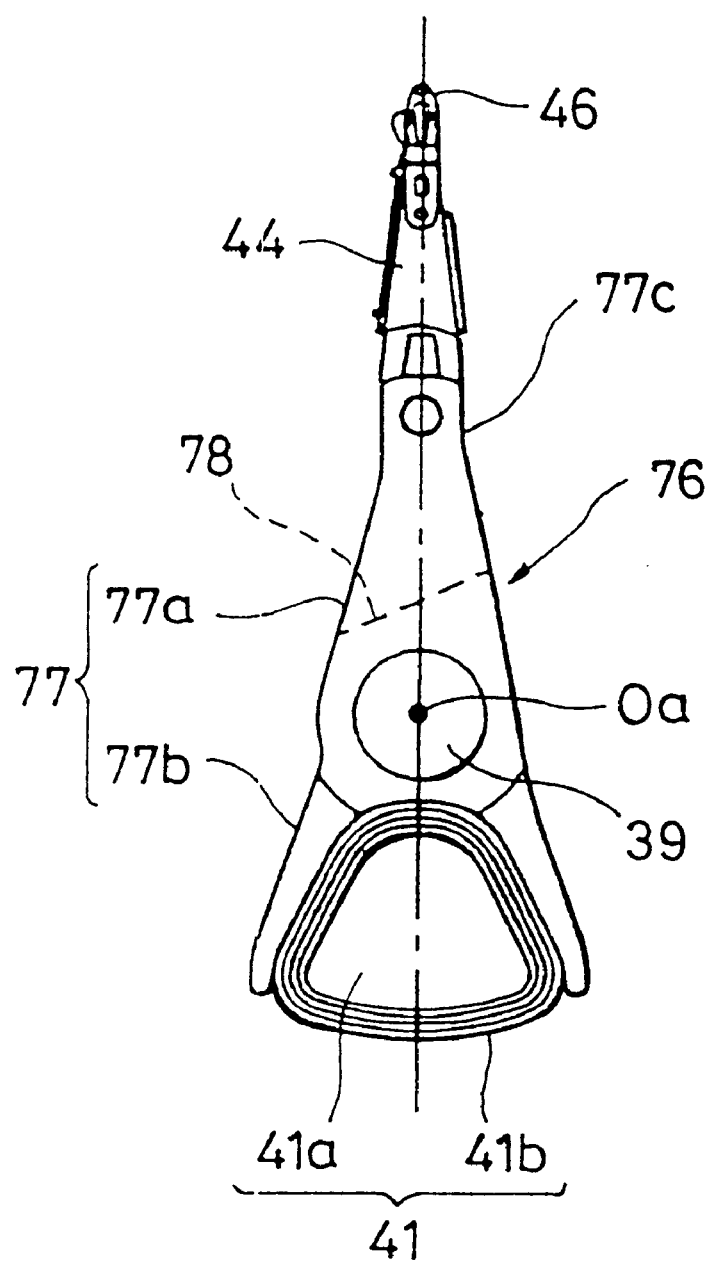
FIG. 18 is a plan view of the rotation actuator of the disk storage apparatus shown in FIG. 17.

As shown in FIG. 18, the inline-type actuator 76 has a rotary arm 77 linearly extended. A drive coil 41 is fitted to a branch portion 77b provided on one side of the rotary arm 77, and a slit 78 extended from the tip end of the rotary arm to a middle portion thereof in parallel to a surface direction thereof is provided on a tip-end side of a straight portion 77a extended toward the other side thereof, thereby a pair of supporting pieces 77c being formed. The hard disk 55 loaded onto the spindle motor 7 and rotated thereby is inserted into the slit 78 of the rotary arm 77 so that it can be drawn therefrom.

Moreover, springy supporting members 44 such as gimbaled springs or the like are fixed by some fixing means such as an adhesive or the like on the respective tip end portions of upper and lower supporting pieces 77c of the rotary arm 77. Magnetic heads 45 which are one example of a recording and/or reproducing head as a head portion are fitted to the respective tip end portions of the springy supporting member 44. Moreover, load bars 46 for respectively bringing the upper and lower magnetic heads 45 away from the upper and lower information storage surfaces of the hard disk 55 by elastically deforming the springy supporting members 44 upward and downward upon retraction of the inline-type actuator 76 are fitted to the respective tip end portions of the springy supporting members 44.

A center line of the inline-type actuator 76 having the above arrangement, i.e., a segment between the rotation center Oa of the rotary head-positioning mechanism and the magnetic head is extended in the direction in which the disk cartridge 80 is inserted. In response to such arrangement of the inline-type actuator 76, a ramp member 79 is arranged such that the actuator can be inserted deeper in the depth direction of a cartridge housing 81. The ramp member 79 is extended straight in parallel to a side surface plate of the cartridge housing 81 and has a ramp 79a at a position ahead of a position corresponding to a maximum width of the hard disk 55. Other arrangement thereof is similar to those of the above embodiment.

[disk cartridge according to second embodiment]

Figure 20:
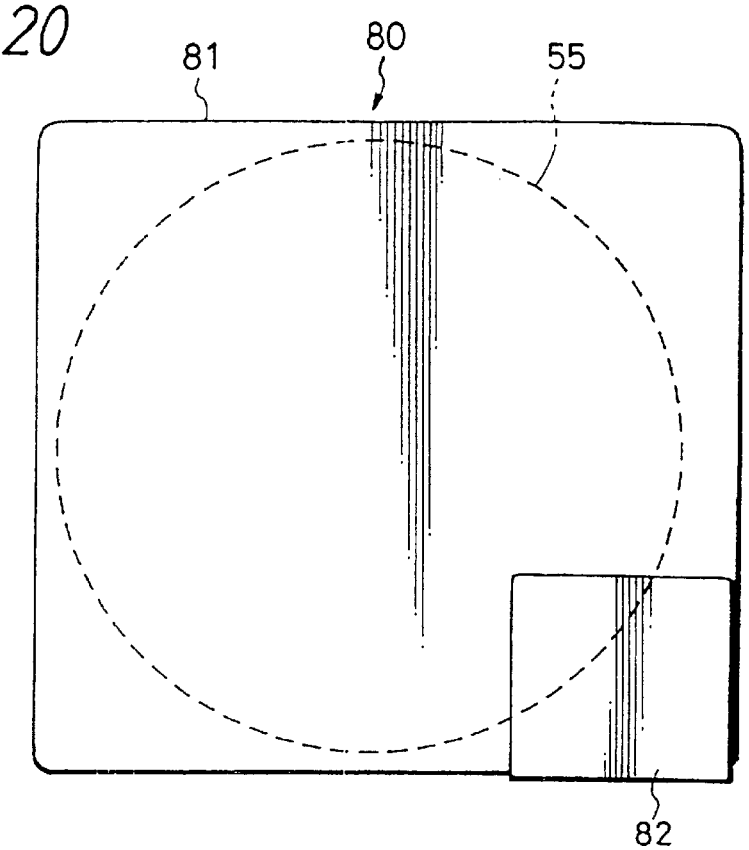
FIG. 20 is a plan view showing a disk cartridge according too the second embodiment of the present invention, in a state that a slidable shutter is closed.
Figure 21:
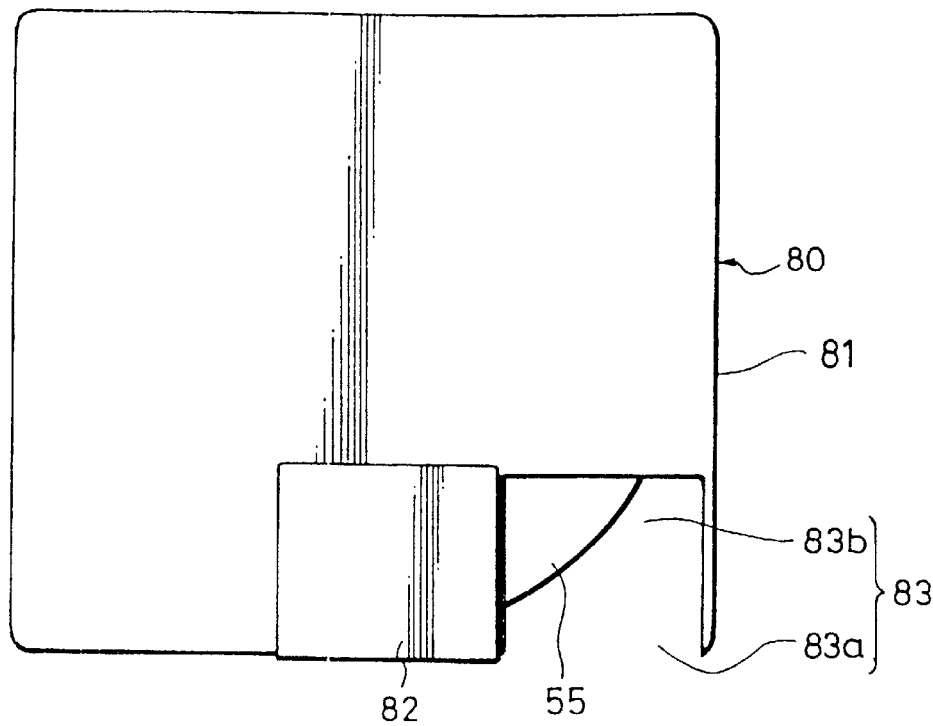
FIG. 21 is a plan view showing the disk cartridge according too the second embodiment of the present invention, in a state that a slidable shutter is opened.

The disk cartridge used in the removable disk storage apparatus 74 is arranged substantially similarly to the disk cartridge 50 described in the above embodiment but is largely different therefrom in that, as shown in FIGS. 20 and 21, a width of a slidable shutter 82 is a substantial half of the width of the slidable shutter 57. Therefore, the width of the slidable shutter 82 is a substantial quarter of the width of the disk cartridge 80.

A head-positioning-mechanism insertion slot 83 opened and closed by the slidable shutter 83 is formed as an opening through a portion not only on a front surface side of the cartridge housing 81 but also on upper and lower surfaces (or only on a lower surface) thereof. Specifically, the head-positioning-mechanism insertion slot 83 has a front surface opening portion 83a opened through the front surface of the cartridge housing 81, and upper and lower opening portions 83b formed through the upper and lower shells so as to be continued from the front surface opening portion 83a. As shown in FIG. 17, when the disk cartridge 80 is loaded, the inline-type actuator 76 is inserted into the head-positioning-mechanism insertion slot 83 until the rotation shaft 39 serving as the rotation center Oa thereof enters the slot, and the ramp member 79 is completely inserted so that its fixed portion should be inserted.

The reason for realizing a shorter width of the slidable shutter 82 is that, as clear from FIG. 17, a rotation angle of the rotary head-positioning mechanism is not changed but the rotation center Oa thereof is set in the vicinity of the center of the head-positioning-mechanism insertion slot 83. In response to this setting, a disk center of the hard disk 55 is set so as to be offset from the center line of the cartridge housing 81 by a distance f.

According to the disk storage apparatus of the second embodiment, while the width of the disk cartridge 80 becomes larger and hence an offset amount of the disk center Od relative to the reference line LB of the apparatus body 75, i.e., an offset amount of the rotation center Od of the spindle motor 7 becomes f and becomes slightly larger than that of the first embodiment, it is possible to simplify a shape of the rotary arm 77.

According to the disk cartridge 80 of the second embodiment, it is possible to shorten a slide distance by reducing the width of the slidable shutter 82, and it is possible to further improve the reliability in the recording and reproduction by reliably preventing the dusts from entering the disk cartridge 80. Therefore, the length of the head-positioning-mechanism insertion slot 81 of the disk cartridge 80 can be set equal to or larger than ¼ of the length of the disk cartridge 80 and also equal to or smaller than ½ thereof in consideration of that of the first embodiment. If the length of the head-positioning-mechanism insertion slot 83 is equal to or smaller than ¼ of the length of the disk cartridge 80, then a rotatable range of the inline-type actuator 76 becomes too narrow, which is not preferable.

Other arrangement and actions are similar to those of the first embodiment. With such embodiment, it is possible to achieve the effect similar to that of the first embodiment.

Figure 19:
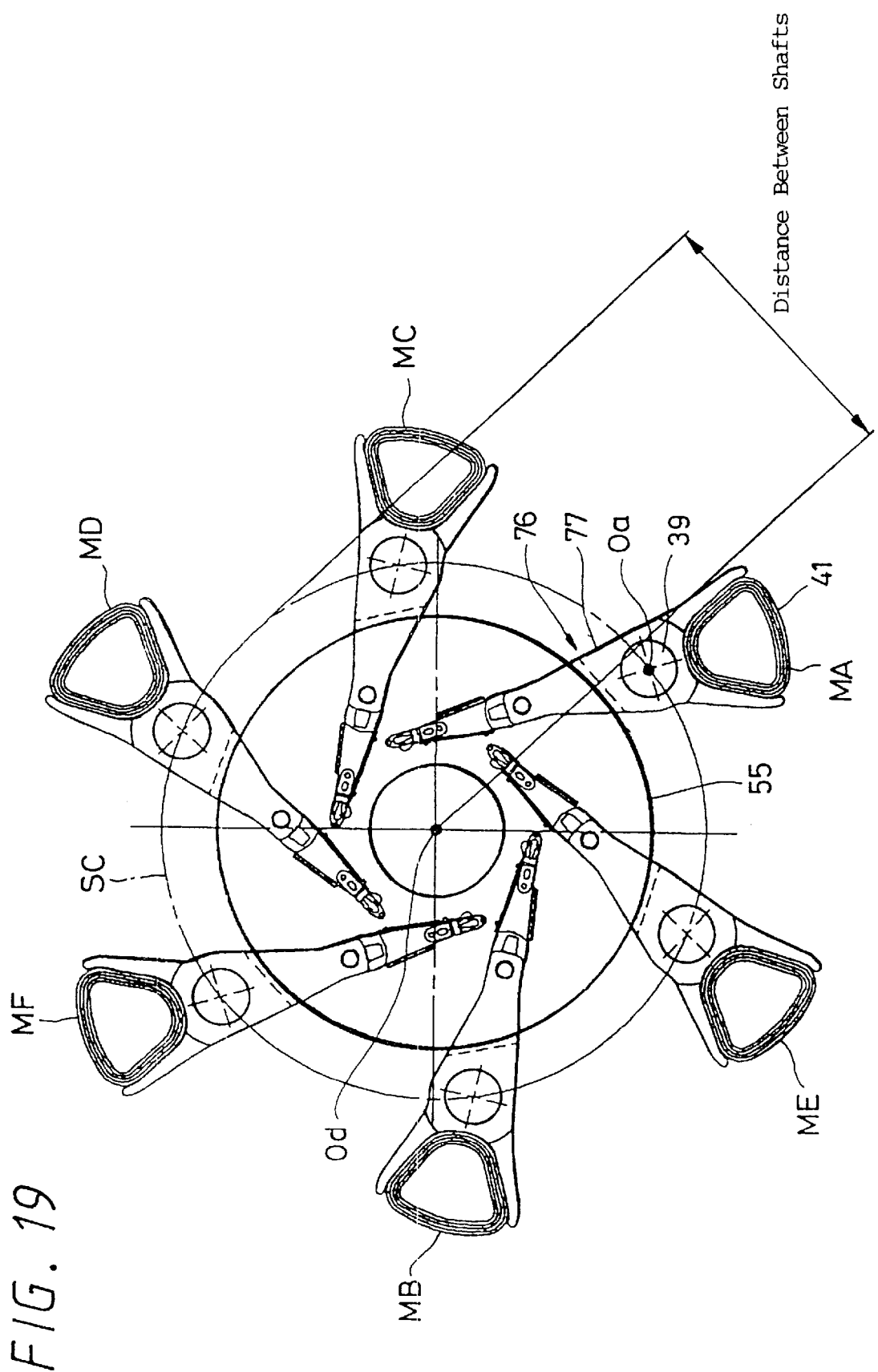
FIG. 19 is a plan view used to explain a position where the rotation actuator of the disk storage apparatus shown in FIG. 17 is disposed.

The position of the rotation center Oa of the inline-type actuator 76 is limited to points on a circumference of the reference circle SC employing a segment from the rotation center Od of the spindle motor 7 to the rotation center Oa as its radius. However, as shown in FIG. 19, in theory, the rotation center Oa may be located on any of the points on the circumference.

However, if the inline-type actuator 76 is located at a position MB or MC, then a width-direction dimension of the apparatus body 75 becomes longer, which makes the whole apparatus larger-sized. On the other hand, a position MF is a point symmetry position with respect to a position MA. Since this position is located on the side of the head-positioning-mechanism insertion slot 81, if the inline-type actuator 76 is located at the position, then a depth-direction dimension of the apparatus body 75 becomes longer similarly to deposition of the actuator at the position MD, which makes the whole apparatus larger-sized.

At last, it is preferable to locate the inline-type actuator 76 at the position MA or in the vicinity thereof as shown in FIG. 17.

The present invention is not limited to the first and second embodiments. While in the above embodiment the disk storage apparatus employing the magnetic disk as the disk-like storage medium has been described, it is needless to say that storage media of other recording modes such as an optical disk, a magneto-optical disk or the like can be employed. While in the above embodiments the reproduction-only disk storage apparatus to which the present invention is applied has been described, it is needless to say that the present invention can be applied to a recording-only disk storage apparatus and further to a disk storage apparatus for both of the recording and reproduction.

[effect of the invention]

According to the present invention, since the removable disk storage apparatus can employ the rotation actuator while the disk cartridge employs the slidable shutter, it is possible to make it difficult for the dust to enter the disk cartridge and to improve the reliability in the recording and/or reproduction. Moreover, since the rotation actuator can be employed as an actuator of the head positioning mechanism, it is possible to secure higher shock-proof property. Since the inertia mass becomes smaller, the seek speed can be set faster as compared with that of the linear-movement actuator. Moreover, since the arrangement of the rotation actuator is simple as compared with that of the linear-movement actuator, it is possible to provide the disk storage apparatus which can be manufactured with lower costs.

Since the shutter opening and closing shaft required by the conventional slidable shutter is not required, it is possible to simplify the arrangement of the disk cartridge, and it becomes easy to make the cartridge thinner. Moreover, the springy body of the slidable shutter and the disk-like storage medium are prevented from interfering each other, and hence the springy body is brought in contact with the information storage surface to thereby break the information storage surface and break the magnetic head. Moreover, since the abrasion powders produced from the slidable contact surface and resulting from the elastic deformation of the springy body are prevented from directly falling on the information storage surface of the disk-like storage medium, it is possible to provide the disk cartridge in which the abrasion powders are prevented from disturbing a head unit's stably floating and from breaking the head unit.

We claim:

1. A disk storage apparatus for storing a disk cartridge having a front face and which includes a disk like storage medium, comprising:

an apparatus body onto which said disk cartridge is detachably loaded;

a shutter opening and closing mechanism provided on said apparatus body for, in an interlocking operation with an operation of attaching and detaching said disk cartridge, opening and closing a shutter capable of opening and closing a head-positioning-mechanism insertion slot of said disk cartridge; and a rotary head-positioning mechanism, which includes a head portion, being such that said head portion is inserted from said head-positioning mechanism insertion slot into said disk cartridge by a rotary operation, and a rotation center of said rotary head-positioning mechanism is provided on said apparatus body adjacent to the head-positioning mechanism insertion slot on a line intersecting from a center of said disk-like storage medium to said disk cartridge front face perpendicularly.

2. The disk storage apparatus according to claim 1, wherein said rotary head-positioning mechanism includes a rotation actuator which has a bent portion provided at a middle portion between the rotation center of said rotary head-positioning mechanism and said head portion for preventing said rotation actuator from being in contact with an edge of said head-positioning-mechanism insertion slot of said disk cartridge.

3. A disk storage apparatus according to claim 2, wherein said rotation actuator comprises an elastic supporting member having said head portion provided at its tip end and a rotary arm having said bent portion and for supporting said elastic supporting member so that said elastic supporting member can be rotated.

4. A disk storage apparatus according to claim 3, wherein when said disk cartridge is inserted, a portion, from said bent portion of said rotary arm to said head unit, of said rotation actuator is inserted through said head-positioning-mechanism insertion slot into said disk cartridge.

5. A disk storage apparatus according to claim 1, wherein a length of said head-positioning-mechanism insertion slot of said disk cartridge is equal to or larger than ½ of a length of said disk cartridge.

6. A disk storage apparatus according to claim 5, wherein a movement distance of said shutter of said disk cartridge exceeds a length of said head-positioning-mechanism insertion slot.

7. A disk storage apparatus according to claim 1, wherein a segment connecting a rotation center of a spindle motor of said disk storage apparatus and a rotation center of said rotary head-positioning mechanism is aligned with a reference line of an apparatus body.

8. A disk storage apparatus according to claim 1, wherein a segment connecting a rotation center of a spindle motor of said disk storage apparatus and a rotation center of said rotary head-positioning mechanism is in parallel to a reference line of an apparatus body.

9. A disk storage apparatus according to claim 1, wherein said disk cartridge comprises a slidable shutter for opening and closing said head-positioning-mechanism insertion slot by its sliding operation.

10. A disk storage apparatus according to claim 1, wherein a length of said head-positioning-mechanism insertion slot of said disk cartridge is equal to or smaller than ¼ thereof.

11. A disk storage apparatus employing a detachable disk cartridge, wherein said disk cartridge comprises a head-positioning-mechanism insertion slot, said head-positioning-mechanism insertion slot can be opened and closed by a slidable shutter moving on said disk cartridge outer surface in parallel, said disk apparatus comprises a spindle motor for rotating a disk and a rotary head-positioning mechanism having a bent portion at its middle portion and comprising a rotation actuator, and a segment connecting a rotation center of said spindle motor and a rotation center of said rotary head-positioning mechanism lies at right angles to a segment representing a parallel movement of said slidable shutter.

12. A disk storage apparatus according to claim 11, wherein an angle formed by the segment connecting the rotation center of the spindle motor of said disk storage apparatus and the rotation center of said rotary head-positioning mechanism and the segment representing the parallel movement of said slidable shutter is about 80° to 90°.

13. A disk storage apparatus according to claim 11, wherein the segment connecting the rotation center of the spindle motor of said disk storage apparatus and the rotation center of said rotary head-positioning mechanism lies at right angles to a plane of a front surface of said disk cartridge.

14. A disk storage apparatus according to claim 11, wherein an angle formed by the segment connecting the rotation center of the spindle motor of said disk storage apparatus and the rotation center of said rotary head-positioning mechanism and a plane of a front surface of said disk cartridge is about 80° to 90°.

15. A disk storage apparatus according to claim 11, wherein a segment connecting a rotation center of a spindle motor of said disk storage apparatus and a rotation center of said rotary head-positioning mechanism is aligned with a reference line of an apparatus body.

16. A disk storage apparatus according to claim 11, wherein a segment connecting a rotation center of a spindle motor of said disk storage apparatus and a rotation center of said rotary head-positioning mechanism is in parallel to a reference line of an apparatus body.

17. A disk storage apparatus according to claim 11, wherein the rotation actuator employed by said rotary head-positioning mechanism is an inline-type actuator.

* * * * *